US009444726B2

(12) United States Patent
Baldwin

(10) Patent No.: US 9,444,726 B2
(45) Date of Patent: Sep. 13, 2016

(54) DISTRIBUTING COMMUNICATION OF A DATA STREAM AMONG MULTIPLE DEVICES

(75) Inventor: Christopher Baldwin, Crystal Lake, IL (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 77 days.

(21) Appl. No.: 13/563,234

(22) Filed: Jul. 31, 2012

(65) Prior Publication Data

US 2014/0040421 A1     Feb. 6, 2014

(51) Int. Cl.
*G06F 15/16*     (2006.01)
*H04L 12/707*    (2013.01)

(52) U.S. Cl.
CPC ............. *H04L 45/24* (2013.01); *G06F 15/16* (2013.01)

(58) Field of Classification Search
CPC ... G06F 15/16; H04W 84/18; H04N 21/632; H04L 65/4084; H04L 67/104; H04L 67/108; H04L 67/1068; H04L 45/24
USPC ................ 709/217, 219, 227–228, 231, 224
See application file for complete search history.

(56) References Cited

U.S. PATENT DOCUMENTS

| | | | |
|---|---|---|---|
| 5,546,379 A | 8/1996 | Thaweethai et al. | |
| 7,688,730 B2 | 3/2010 | Beadle | |
| 7,720,098 B1 * | 5/2010 | Allen et al. | 370/468 |
| 7,860,081 B2 * | 12/2010 | Dawson et al. | 370/352 |
| 7,894,470 B2 | 2/2011 | Ruckart | |
| 7,894,828 B2 | 2/2011 | Dawson et al. | |
| 8,068,450 B2 | 11/2011 | Kozisek | |
| 8,170,056 B2 | 5/2012 | Allen et al. | |
| 2002/0004788 A1 | 1/2002 | Gros et al. | |
| 2002/0091843 A1 * | 7/2002 | Vaid | 709/230 |
| 2005/0021621 A1 | 1/2005 | Welch et al. | |
| 2005/0025163 A1 * | 2/2005 | Christie, IV | 370/401 |
| 2005/0074017 A1 * | 4/2005 | Qian | H04M 3/2263 370/401 |
| 2006/0070115 A1 * | 3/2006 | Yamada et al. | 726/3 |

(Continued)

FOREIGN PATENT DOCUMENTS

WO     9951001     10/1999

OTHER PUBLICATIONS

Adtran, Inc., "Why Buy Atlas Video Switch, Atlas 800 Series," Mar. 2004 (2 pages).

(Continued)

*Primary Examiner* — Brian J Gillis
*Assistant Examiner* — Amy Ling
(74) *Attorney, Agent, or Firm* — Hanley, Flight & Zimmerman, LLC

(57) ABSTRACT

Methods, apparatus and articles of manufacture for distributing communication of a data stream among multiple devices are disclosed. Example methods disclosed herein include sending a request to a network to establish a shared connection to distribute communication of a first data stream among a plurality of devices. The request is generated by a separate device that is different from the plurality of devices. Such example methods also include receiving, in response to the request, network addresses to be used to establish respective data connections with the plurality of devices. The respective data connections are to carry respective partial data streams forming the first data stream. Such example methods further include aggregating the respective partial data streams received from the plurality of devices via the respective data connections to form the first data stream.

18 Claims, 9 Drawing Sheets

(56) References Cited

U.S. PATENT DOCUMENTS

| | | | |
|---|---|---|---|
| 2006/0116149 A1* | 6/2006 | Dunn | H04W 72/005 455/518 |
| 2006/0168290 A1 | 7/2006 | Doron | |
| 2006/0174160 A1 | 8/2006 | Kim | |
| 2007/0050522 A1 | 3/2007 | Grove et al. | |
| 2007/0127386 A1* | 6/2007 | Joshi et al. | 370/252 |
| 2007/0136452 A1 | 6/2007 | Coleman | |
| 2007/0147438 A1 | 6/2007 | Lok | |
| 2008/0075111 A1 | 3/2008 | Hu et al. | |
| 2008/0175188 A1 | 7/2008 | Kozisek | |
| 2008/0262974 A1 | 10/2008 | Kozisek | |
| 2008/0299988 A1 | 12/2008 | Dawson et al. | |
| 2008/0301017 A1* | 12/2008 | Dawson et al. | 705/35 |
| 2009/0046740 A1* | 2/2009 | Ruckart | 370/468 |
| 2009/0083426 A1* | 3/2009 | Cagenius | H04L 29/125 709/227 |
| 2009/0182813 A1* | 7/2009 | McCartie | H04N 7/163 709/205 |
| 2010/0061401 A1 | 3/2010 | Nakahira | |
| 2010/0287296 A1* | 11/2010 | Riggert et al. | 709/231 |
| 2010/0318662 A1* | 12/2010 | Wie et al. | 709/226 |
| 2011/0110324 A1 | 5/2011 | Ruckart | |
| 2013/0114426 A1 | 5/2013 | Polk et al. | |
| 2013/0142040 A1 | 6/2013 | Fryer et al. | |
| 2014/0040364 A1 | 2/2014 | Baldwin et al. | |
| 2014/0040421 A1 | 2/2014 | Baldwin | |
| 2014/0040493 A1 | 2/2014 | Baldwin | |

OTHER PUBLICATIONS

Kear, Sam, "Dual Wan Router—How to Load Balance Using Sen," http://skear.hubpages.com/hub/Dual-Wan- Router-How-To-Build-One-On-a-Budget, accessed on Nov. 29, 2011 (7 pages).

Vicomsoft, "Bandwidth Aggregation, Bonding and Teaming," http://www.vicomsoft.us/learning-center/bandwidth-aggregation-bonding-and-teaming/, accessed on Nov. 29, 2011 (14 pages).

Wikipedia, "Channel Bonding," http://en.wikipedia.org/wiki/Channel_bonding, accessed on Apr. 10, 2012 (2 pages).

Wikipedia, "Link Aggregation," http://en.wikipedia.org/wiki/Link_aggregation, accessed on Apr. 10, 2012 (8 pages).

Wikipedia, "Stackable Switch," http://en.wikipedia.org/wiki/Stackable_switch, accessed on Nov. 29, 2011 (3 pages).

U.S. Appl. No. 13/311,462, "Pooling Available Network Bandwidth From Multiple Devices," filed Dec. 5, 2012 (38 pages).

United States Patent and Trademark Office, "Non-Final Office Action", issued in connection with U.S. Appl. No. 13/563,218, dated Jan. 23, 2014 (18 pages).

United States Patent and Trademark Office, "Non-Final Office Action", issued in connection with U.S. Appl. No. 13/311,462 dated Feb. 19, 2014 (26 pages).

United States Patent and Trademark Office, "Final Office Action", issued in connection with U.S. Appl. No. 13/311,462 dated Jun. 13, 2014 (29 pages).

United States Patent and Trademark Office, "Non-Final Office Action", issued in connection with U.S. Appl. No. 13/563,225, dated Aug. 28, 2014 (15 pages).

United States Patent and Trademark Office, "Final Office Action", issued in connection with U.S. Appl. No. 13/563,218, dated Aug. 20, 2014 (19 pages).

United States Patent and Trademark Office, "Notice of Allowance", issued in connection with U.S. Appl. No. 13/311,462, dated Oct. 30, 2014 (8 pages).

United States Patent and Trademark Office, "Final Office Action", issued in connection with U.S. Appl. No. 13/563,225, dated Mar. 2, 2015 (16 pages).

United States Patent and Trademark Office, "Non-Final Office Action", issued in connection with U.S. Appl. No. 13/563,218, dated Jun. 10, 2015 (22 pages).

United States Patent and Trademark Office, "Non-Final Office Action", issued in connection with U.S. Appl. No. 13/563,225, dated Jul. 20, 2015 (16 pages).

United States Patent and Trademark Office, "Notice of Allowance", issued in connection with U.S. Appl. No. 13/563,218, dated Jan. 29, 2016 (15 pages).

United States Patent and Trademark Office, "Final Office Action", issued in connection with U.S. Appl. No. 13/563,225, dated Jan. 20, 2016 (17 pages).

* cited by examiner

DISTRIBUTING COMMUNICATION OF A DATA STREAM AMONG MULTIPLE DEVICES

FIELD OF THE DISCLOSURE

This disclosure relates generally to data communications and, more particularly, to distributing communication of a data stream among multiple devices.

BACKGROUND

Consumers are becoming accustomed to near ubiquitous access to Internet-based and web-based services and applications. In the past, data intensive applications, such as steaming video, on-demand video, video conferencing, etc., were limited to devices, such as personal computers, set-top boxes, stand-alone video conferencing systems, etc., having dedicated, high-speed (e.g., broadband) data connections provided by an Internet service provider (ISP). Today, consumers have access to a plethora of electronic devices, including smartphones, tablet computers, personal data devices, personal digital assistants, etc., that support Internet connectivity, and may have sufficient processing power to support at least some media-rich applications. However, while a consumer may own or have access to a number of such electronic devices, the data bandwidth capabilities of each individual device may be limited such that none of the consumer's devices, on its own, can support the data transfer speeds associated with a data intensive application the consumer wishes to access.

BRIEF DESCRIPTION OF THE DRAWINGS

Wherever possible, the same reference numbers will be used throughout the drawing(s) and accompanying written description to refer to the same or like elements, parts, etc.

DETAILED DESCRIPTION

Figure 1:
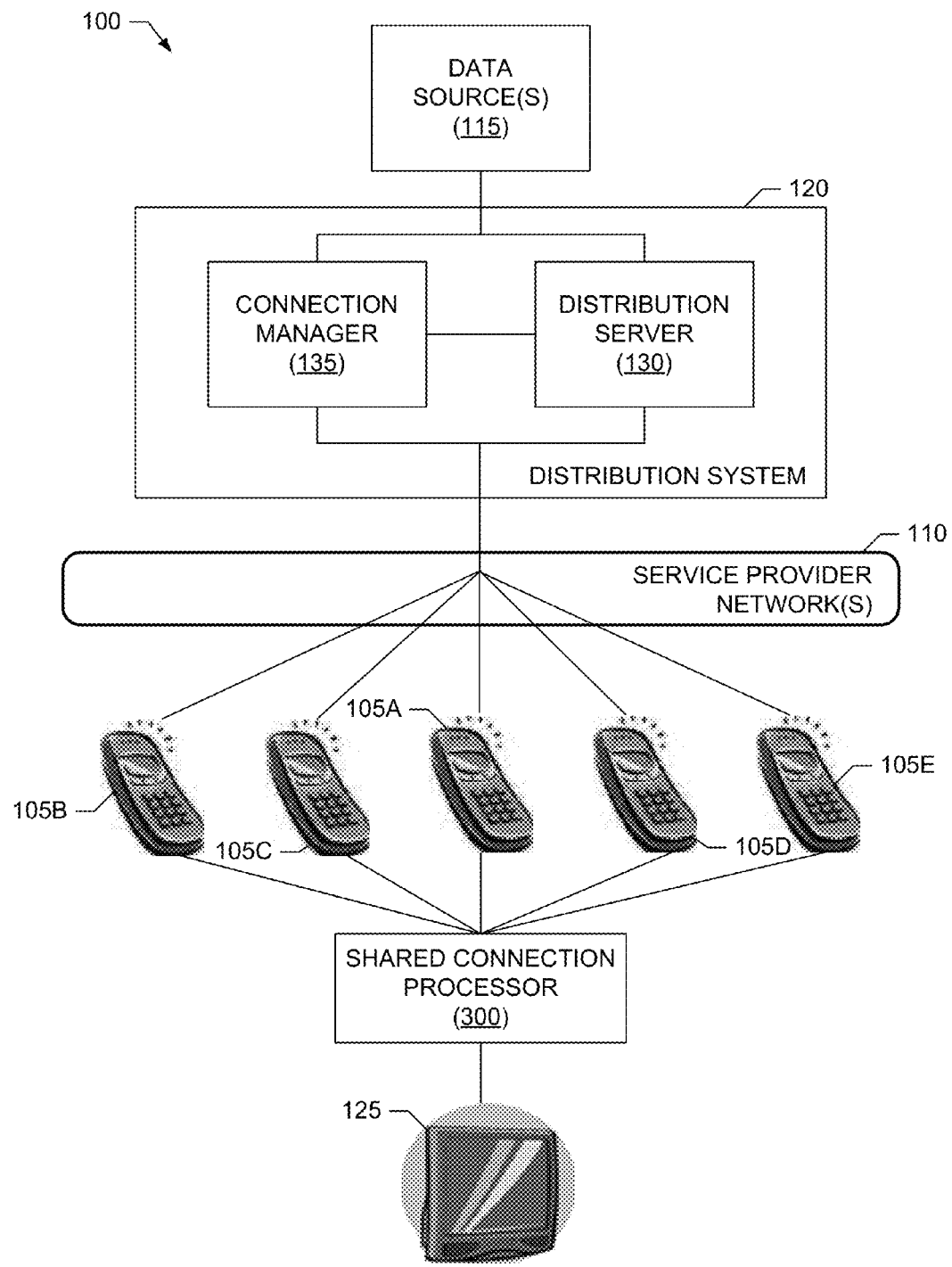
FIG. 1 is block diagram of an example communication system including an example shared connection processor and capable of distributing communication of a data stream among multiple example devices as disclosed herein.

Methods, apparatus and articles of manufacture (e.g., storage media) for distributing communication of a data stream among multiple devices are disclosed herein. Example methods disclosed herein to distribute communication of a first data stream among multiple devices include sending a request to a network to establish a shared connection to distribute the communication of the first data stream among a group of devices. In some such examples, the request is generated by a separate device that is different from the plurality of devices. Such example methods also include receiving, in response to the request, network addresses to be used to establish respective data connections with the group of devices. In some such examples, the respective data connections are to carry respective partial data streams forming the first data stream. Such example methods further include aggregating the respective partial data streams received from the group of devices via the respective data connections to form the first data stream.

Some such example methods further include identifying the group of devices via which communication of the first data stream is to be distributed. Such example methods also include establishing respective communication links with the group of devices via which the respective partial data streams are to be received.

Additionally or alternatively, in some such examples, a number of network addresses received corresponds to a number of devices indicated in the request as being included in the shared connection. Some such example methods further include distributing the network addresses to the group of devices to be used to establish the respective data connections with the group of devices.

Additionally or alternatively, some such example methods further include receiving, in response to the request, a code to associate the group of devices with the shared connection. Such example methods also include distributing the code to the group of devices.

Additionally or alternatively, some such example methods further include receiving the partial data streams via communication links established with the plurality of devices. Additionally or alternatively, some such example methods further include providing the first data stream formed by aggregating the partial data streams to a presentation device.

Additionally or alternatively, some such example methods further include detecting a change in membership of the group of devices. Such example methods also include reporting the change (e.g., to cause the shared connection to be modified accordingly).

Further example methods, apparatus and articles of manufacture (e.g., storage media) for distributing communication of a data stream among multiple devices are described in greater detail below.

As noted above, a consumer may have access to multiple electronic devices that support Internet connectivity, but none of these devices may have sufficient data bandwidth capability, on its own, to support the data intensive applications the consumer may wish to access. For example, a lack of sufficient data bandwidth may prevent a consumer from using a given one of her electronic devices to view a streaming video, participate in a video conference, etc., or may at least degrade the consumer's experience when accessing such applications. In many circumstances, the consumer has access to a number of electronic devices having a combined bandwidth that would be sufficient to support the desired data intensive application. Thus, while the total bandwidth available to the consumer would be sufficient, the distribution of this bandwidth among multiple, individual devices (e.g., which may be of different types) has, in the past, prevented this available bandwidth from being used to its full potential.

Example methods, apparatus and articles of manufacture disclosed herein can overcome at least some of these prior limitations, and enable the bandwidth from multiple devices to be combined. For example, such disclosed example methods, apparatus and articles of manufacture distribute communication of a data stream (e.g., such as a high-speed data stream corresponding to a streamlining video application, a video conferencing application, etc.) among the multiple devices, thereby enabling the limited bandwidth of each device to be combined to realize a data connection (referred to herein as a shared connection) having a higher overall bandwidth. Prior techniques for combining the bandwidth of separate communication links, such as link bonding or aggregation, can be limited in that they are restricted to use with fixed, or static, communication links implemented using the same technology and/or provided by the same service provider, and/or require the communication links being combined to terminate at the same communication endpoint.

Unlike such prior techniques, example methods, apparatus and articles of manufacture disclosed herein enable distribution of the communication of a data stream among multiple, different endpoints (e.g., electronic devices), which may be the same or different and which may receive service (e.g., Internet service) from the same or different providers. Also, example methods, apparatus and articles of manufacture disclosed herein support distribution of the data stream among different data connections in accordance with the different device capabilities of the devices with which the data connections are established. Furthermore, example methods, apparatus and articles of manufacture disclosed herein support flexible combining of device bandwidth such that, for example, devices may be added to and/or removed from the shared connection while the data stream is still being communication. Further aspects of the disclosed example methods, apparatus and articles of manufacture are described in greater detail below.

Turning to the figures, a block diagram of an example communication system 100 capable of distributing communication of a data stream among multiple example devices as disclosed herein is illustrated in FIG. 1. The communication system 100 includes multiple example user devices 105A-E in communication with one or more example service provider network(s) 110. The service provider network(s) 110 can correspond to any type of service provider's network, such as a mobile service provide network, a broadband service provider network, a cable service provider network, a satellite service provider network, an Internet service provider (ISP) network, etc., capable of providing access to the Internet and/or any service-oriented and/or content delivery network. In the example communication system 100 of FIG. 1, Internet service is provided to each of the multiple user devices 105A-E by the same or different service provider network(s) 110. Furthermore, the user devices 105A-E may have different device capabilities such that, for example, some or all of the user devices 105A-E have different respective bandwidth or data rate limits for data received from and/or transmitted to the service provider network 110.

Although the user devices 105A-E are depicted as mobile phones in FIG. 1, the user devices 105A-E are not limited thereto. For example, the user devices 105A-E can each be any device that is capable of accessing the service provider 110, which in turn provides access to the Internet and/or any other type(s) of content delivery and/or service-oriented network(s). Each user device 105A-E is also able to exchange data with other external device(s), such as via tethering and/or any external data connection (such as a Wi-Fi connection, a Bluetooth connection, a universal serial bus (USB) connection, a docking connection, etc.). As such, the user devices 105A-E can be implemented by, for example, mobile phones (such as smartphones, cellular phones, 3G, 4G or long term evolution (LTE) wireless devices, etc.), wireless access points (such as Wi-Fi devices, Bluetooth devices, aircards, etc.), personal data devices (such as personal digital assistants (PDAs), e-readers, etc.), broadband modems (such as DSL modems, cable modems, satellite modems, etc.) and/or any other type(s) of electronic devices or combinations thereof.

In the illustrated example of FIG. 1, the service provider network 110 provides the user devices 105A-E with access to one or more example data sources 115. The data sources(s) 115 include, for example, one or more streaming media sources (e.g., such as streaming services offered by Netflix®, Hulu®, etc.), one or more on-demand media download sources (e.g., such as Apple iTunes®), one or more video conferencing services, etc. The data source(s) 115 can also include other user devices (not shown) capable of uploading content (e.g., such as video chat content) that is able to be received by the user devices 105A-E.

The example communication system 100 of FIG. 1 further includes an example distribution system 120 that enables the communication of a particular data stream from the data sources(s) 115 to be distributed among the multiple user devices 105A-E. For example, the distribution system 120 may be used to distribute portions of a data stream, which is being communicated from a data source 115 to one of the user devices 105A-E, such as the user device 105A, to some or all of the multiple user devices 105A-E. As described in greater detail below, the partial data streams received by some or all of the user devices 105A-E are then aggregated to form the original data stream, which may be processed by the user device 105A (e.g., for presentation by the user device 105A) and/or forwarded to an example output device 125 (e.g., for presentation by the output device 125). In this way, the individual bandwidths and/or data transmission capacity limits of each of the user devices 105A-E can be combined to yield an aggregated bandwidth and/or data transmission capacity capable of carrying a data stream that would not have been supported by the user devices 105A-E otherwise. The output device 125 of the illustrated example can be implemented by any type of device capable of processing, presenting and/or otherwise using a data stream, such as a television, a set-top box, a personal computer, etc., and/or any other type of user device, such as device similar to the user devices 105A-E described above.

To support distributing communication of a data stream among the multiple user devices 105A-E as disclosed herein, the distribution system 120 of the illustrated example further includes an example distribution server 130 and an example connection manager 135. As described in greater detail below, the distribution server 130 is responsible for splitting a complete data stream being provided by a data source 115 into multiple partial data stream to be communicated to the respective user devices 105A-E. As described in greater detail below, the connection manager 135 is responsible for establishing, monitoring and otherwise managing the data connections with the user devices 105A-E that collectively form the shared connection via which the original data stream is communicated as a group of partial data stream to the user devices 105A-E.

The communication system 100 of the illustrated example further includes an example shared connection processor 300. The shared connection processor 300 of the illustrated example is a device, which is separate from the user devices 105A-E, that can be used to aggregate the partial data streams received from the user devices 105A-E to form the complete data stream being provided by a target data source 115. For example, the shared connection processor 300 can receive the partial data streams via an ad-hoc network, tethering connections and/or other local communication links established with the user devices 105A-E via any appropriate technology, such as Wi-Fi connections, Bluetooth connections, USB connections, a docking connections, etc. In some examples, the shared connection processor 300 additionally or alternatively can send a shared connection request (e.g., using a data connection provided by one of the user devices 105A-E) to the distribution system 120, receive network addresses and/or sharing code (e.g., using a data connection provided by one of the user devices 105A-E) in response to the request, and distribute the network addresses and/or sharing code to the user devices 105A-E (e.g., via the local communication links established with the user devices 105A-E), as described in greater detail below. In some examples, the shared connection processor 300 can further monitor the shared connection (e.g., by monitoring the status of the partial data streams being received from the user devices 105A-E) and report status changes to the distribution system 120.

Figure 5:
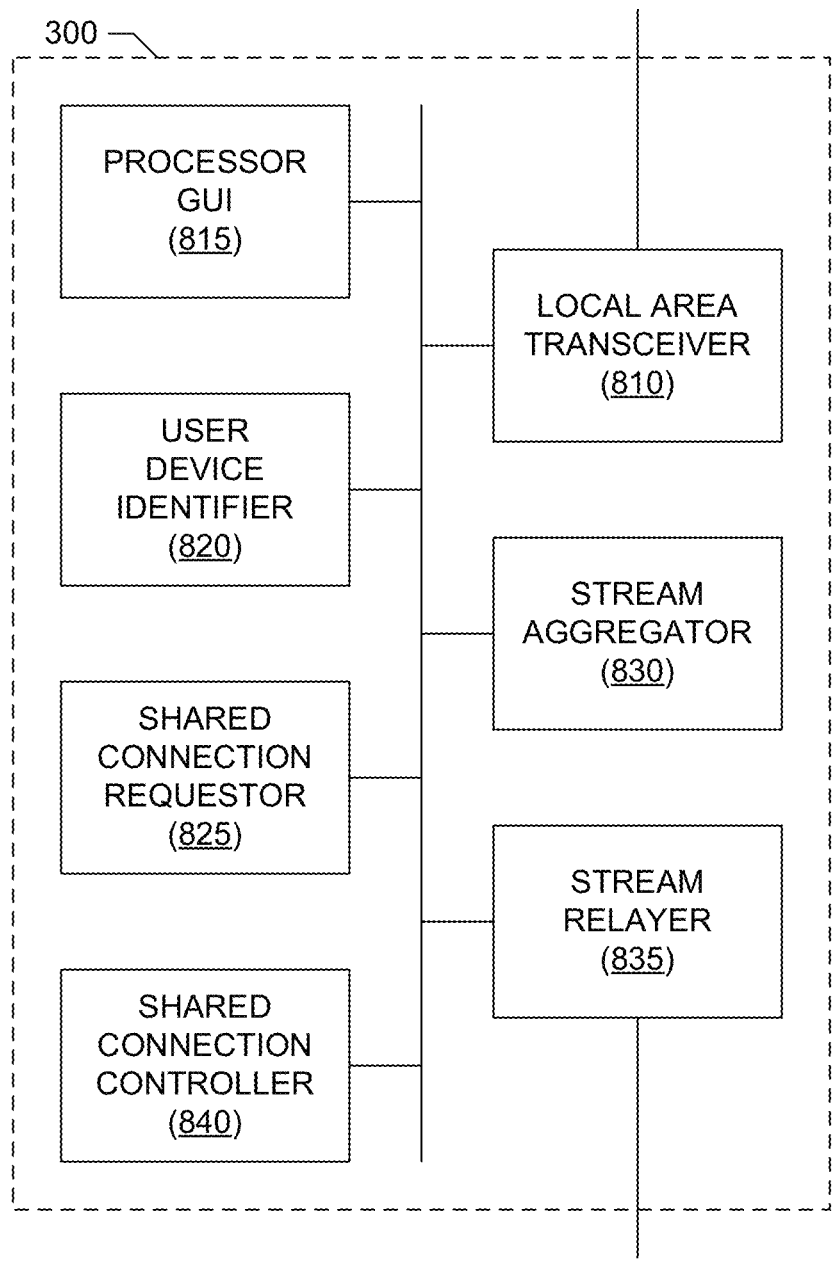
FIG. 5 is block diagram illustrating an example implementation of the shared connection processor of FIG. 1.

The shared connection processor 300 can be implemented by any processing device, such as a router, a set-top box, a server, etc. In some examples, the shared connection processor 300 can be implemented by, or included in, the output device 125. A further example implementation of the shared connection processor 300 is illustrated in FIG. 5, which is described in greater detail below.

An example of distributing communication of a data stream among the multiple user devices 105A-E in the context of the communication system 100 is now described. Consider, for example, a scenario in which a user endeavors to use the shared connection processor 300 to access a data source 115 to begin data streaming or downloading using data stream distribution as disclosed herein. In the illustrated example, the shared connection processor 300 is responsible for establishing the shared connection between the user devices 105A-E, managing the shared connection, selecting the target data source 115, etc. The shared connection established by the shared connection processor 300 is used to convey the data stream from the selected data source 115 to the user devices 105A-E.

In such examples, the shared connection processor 300 establishes local communication links with one or more of the user devices 105A-E. For convenience, and without loss of generality, it is assumed that all of the user devices 105A-E are to be included in the shared connection. For example, the user devices 105A-E can establish an ad-hoc network, tethering connections and/or other local communication links with the shared connection processor 300 via any appropriate technology, such as Wi-Fi connections, Bluetooth connections, USB connections, a docking connections, etc. In the illustrated example, the shared connection processor 300 uses the local communication links to determine the number of user devices 105A-E that are to be included in the shared connection associated with a particular target data stream. The shared connection processor 300 then sends a shared connection request (e.g., using a data connection provided by one of the user devices 105A-E), for receipt by the distribution system 120, which requests that a shared connection be established to distribute a data stream from a target data source 115. In the illustrated example, the shared connection request identifies the target data source 115 and includes the number of user devices 105A-E to be included in the shared connection.

In the example communication system 100 of FIG. 1, the receiving service provider network 110 forwards the shared connection request to the distribution system 120 and, in particular, the connection manager 135, to enable the shared connection among the user devices 105A-E to be established. In the illustrated example, the distribution system 120 in combination with the user devices 105A-E implement functionality to enable respective data connections to be established with the user devices 105A-E. For example, the distribution system 120 in combination with the user devices 105A-E implement functionality to enable the user devices 105A-E to initiate establishment of their respective data connections via which data streaming is to be distributed. For example, the distribution system 120 can provide a set of network addresses (e.g., uniform resource identifiers (URIs), IP addresses, etc.) and/or a sharing code to be used by the user devices 105A-E to establish the data connections for use in distributing a data stream, and to associate the user devices 105A-E with a particular (e.g., unique) group of devices that is to receive a particular data stream.

For example, in the communication system 100 of FIG. 1, the service provider network 110 serving the user device whose data connection is being used by the shared connection processor 300 receives the shared connection request and forwards it to the connection manager 135. In response to receiving the request, the connection manager 135 returns a set of network addresses, such as IP addresses, URIs, etc., to the shared connection processor 300 (e.g., using the data connection provided by one of the user devices 105A-E) to be used by the user devices 105A-E to establish respective data connections with the distributions system 120. For example, the connection manager 135 may return a number of network addresses corresponding to the number of user devices indicated in the shared connection request such that each user device 105A-E can be associated with a different respective network address. In response to receiving the network addresses from the connection manager 135, the shared connection processor 300 of the illustrated example forwards the network addresses to the user devices 105A-E via the local communication links (e.g., with each user device receiving a different network address). Each user device 105A-E then sends a request to the network address it received from the shared connection processor 300, which is received by the connection manager 135 of the distribution system 120. Because the connection manager 135 knows which network addresses it assigned to a particular shared connection request, the connection manager 135 can associate the user devices 105A-E with a particular shared connection request based on the network addresses used by the user devices 105A-E to contact the distribution system 120. Thus, in response to receiving a communication from a particular user device 105A-E at the provided network address, the connection manager 135 can establish a data connection with the particular user device 105A-E and associate it with the proper shared connection request.

Additionally or alternatively, in response to receiving the shared connection request from the shared connection processor 300, the connection manager 135 may return a sharing code, or a shared connection code, such as a unique number or alphanumeric sequence, to be associated with that particular shared connection request. In response to receiving the sharing code from the connection manager 135, the shared connection processor 300 of the illustrated example forwards the sharing code to the user devices 105A-E via the local communication links. The user devices 105A-E can then include this code in a request sent to the distribution system 120 to cause the connection manager 135 to associate, based on the sharing code, the user devices 105A-E with the particular shared connection requested by the shared connection processor 300. In some examples, the sharing code can be used with or without a group of network addresses also being provided by the connection manager 135. For example, user devices, such as the devices 105A-E, could be configured to use just a single network address (or relatively small number of network addresses) to contact the distribution system 120 with a sharing request including their assigned sharing code. In such examples, the connection manager 135 can rely on the sharing code to group user devices into different requested shared connections, and can then establish the data connections with the user devices accordingly.

In some examples, the connection manager 135 further establishes the data connections with the devices 105A-E by associating respective data transmission characteristic(s) with each of the data connections. In the illustrate example, the data transmission characteristic(s) are determined by the connection manager 135 based on the device capability information obtained for the user devices 105A-E. For example, the connection manager 135 can allocate different bandwidth and/or data rate limits to some or all of the data connections based on the device capability information for each of the devices 105A-E.

In the illustrated example, the connection manager 135 actively determines the device capability information for the user devices 105A-E (e.g., because the connection manager 135 may not be able to rely on receiving such information from the service provider network(s) 110). For example, the connection manager 135 may exchange communication messages, such a network ping messages, with each of the user devices 105A-E included in a shared connection request to determine respective device capability information for the user devices 105A-E, such as bandwidth and/or data rate capabilities, network latencies, etc. Then, as described above, the connection manager 135 can associate respective data transmission characteristic(s) with the data connections established with the user devices 105A-E, with the data transmission characteristic(s) being based on the determined device capability information.

After establishing the data connections with the respective devices 105A-E and determining their respective data transmission characteristics, the connection manager 135 then initiates the data stream from target data source 115 using the target data source identification information included in the shared connection request. The connection manager 135 also invokes the distribution server 130 to begin splitting of the complete data stream among the respective data connections with the user devices 105A-E.

In the illustrated example, the distribution server 130 receives the complete data stream from the target data source 115 corresponding to the target data source identification information included in the shared connection request. The distribution server 130 splits the complete data stream into partial data streams to be communicated to the user devices 105A-E using the communication paths established by the connection manager 135 and the service provider network 110. In some examples, the distribution server 130 generates the partial data streams having different data transmission characteristics, such as different bandwidth limits and/or data rate limits, according to the respective data transmission characteristics associated with the communication paths established with the user devices 105A-E. In some examples, the distribution server 130 may also perform transcoding to change/modify one or more data stream characteristics when splitting the complete data stream into the partial data streams, as described in greater detail below.

In the illustrated example, the user devices 105A-E receive their respective partial bit streams from the distribution server 130 via the established communication paths. The received partial bits streams are then aggregated (e.g., possibly after reordering to account for different data packet arrival times at the different user devices 105A-E) to form the complete data stream being provided by the target data source 115. Any appropriate aggregation technique can be employed in the communication system 100 to aggregate the partial data streams received by the user devices 105A-E. For example, as illustrated in the example of FIG. 1, the user devices 105B-E can forward their respective received partial data streams to the shared connection processor 300 via the local communication links previously established (as described above) between the user devices 105A-E. In such examples, the shared connection processor 300 aggregates the partial data streams received from the user devices 105A-E to form the complete data stream being provided by the target data source 115. The shared connection processor 300 can then process/present the complete data stream itself, or convey the complete data stream to the output device 125 for processing/presentation.

Additionally or alternatively, in some examples, the user devices 105A-E support hierarchical aggregation of the partial data streams to form the complete data stream provided by the target data source 115. In such examples, subsets of the user devices 105A-E work cooperatively to perform a first level of data stream aggregation (e.g., which can be performed in parallel among the different device subsets). For example, the user device 105B could perform aggregation of the partial data streams received by the user devices 105B-C, and the user device 105D could perform aggregation of the partial data streams received by the user devices 105D-E. The resulting aggregated streams from the first level of aggregation can then be provided to another device, such as the user device 105A and/or the shared connection processor 300, to perform a next level of data stream aggregation. Additional levels of aggregation can be implemented, as appropriate.

In some examples, the connection manager 135 and/or the shared connection processor 300 of the communication system 100 monitor the status of the shared connection established between the distribution system and the user devices 105A-E to determine whether to modify distribution of the complete data stream among the multiple devices 105A-E. For example, if one or more of the user devices 105A-E is/are no longer available (e.g., due to leaving the operating area, being turned-off, etc.), the connection manager 135 and/or the shared connection processor 300 can detect such a change and cause the complete data stream to be distributed just over the remaining user devices 105A-E. Additionally or alternatively, a new user device (not shown)

may become available (e.g., by entering the operating area, by being turned on, etc.) for inclusion in the group of devices 105A-E among which the complete data stream is to be distributed. In some examples, the connection manager 135 and/or the shared connection processor 300 can detect such a change and cause the complete data stream to be distributed over the new group user devices 105A-E. Such monitoring capabilities enables the communication system 100 to continue providing the complete data stream from the target data source to the user devices 105A-E even as the composition of the user devices 105A-E changes.

Although five user devices 105A-E are illustrated in the examples of FIG. 1, the communication system 100 can support distributing the communication of a data stream among any number of user devices 105A-E. The communication system 100 can also support any number and/or type(s) of data sources 115, shared connection processors 300 and output devices 125. Furthermore, the communication system 100 can include any number of service provider networks 110 providing the user devices 105A-E with access to the Internet and/or any other content delivery and/or service oriented network(s). Moreover, although one distribution system 120 is illustrated in the example of FIG. 1, the communication system 100 can support any number of distribution systems 120 to distribute communication of data streams among multiple devices as disclosed herein.

Figure 2:
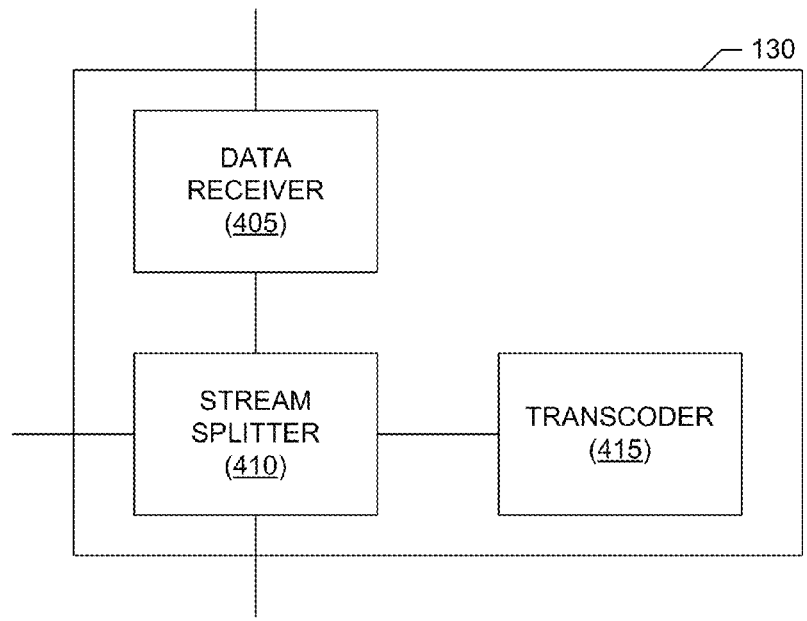
FIG. 2 is block diagram of an example distribution server that may be used to implement the example communication system of FIG. 1.

A block diagram depicting an example implementation of the distribution server 130 of FIG. 1 is illustrated in FIG. 2. The example distribution server 130 of FIG. 2 includes an example data receiver 405 to receive data stream(s) from one or more data sources, such as the data source(s) 115. The example distribution server 130 of FIG. 2 also includes an example stream splitter 410 to split an incoming data stream from a data source into a group of partial streams to be distributed to user devices, such as the user devices 105A-E, via established data connections. In some examples, the stream splitter 410 is configured (e.g., by the connection manager 135) with respective data transmission characteristics for each of the data connections and, thus, for each of the partial data streams into which the incoming data stream is to be split. For example, each data connection and associated partial data stream can be associated with a respective bandwidth limit, data rate limit, etc., tailored to the device capabilities of the particular user device that is to receive that partial data stream. Accordingly, in some examples, the stream splitter 410 may split the incoming data stream into partial data streams having different data transmission characteristics, whereas in other examples, the stream splitter 410 may split the incoming data stream into partial data streams having similar, or the same, data transmission characteristics.

In some examples, the example distribution server 130 of FIG. 2 further includes an example transcoder 415 to transcode the data as it is being split from the incoming data stream into the partial data streams. The transcoder 415 performs transcoding to modify the characteristics of the data payload and/or control information included in the partial data streams generated by the stream splitter 410 from the incoming data stream. For example, based on the device capabilities of a particular user device associated with a particular data stream, the transcoder 415 may be used to modify the partial data stream to change the block size of the data payload, perform data interpolation on the data payload, re-encode control information included in the partial data stream, etc., to conform the partial data stream with one or more communication protocols supported by the user device. Accordingly, the transcoder 415 can support any number and/or type(s) of transcoding algorithms tailored to the expected device capabilities of user devices that are to receive the partial data streams generated by the distribution server 130.

Figure 3:
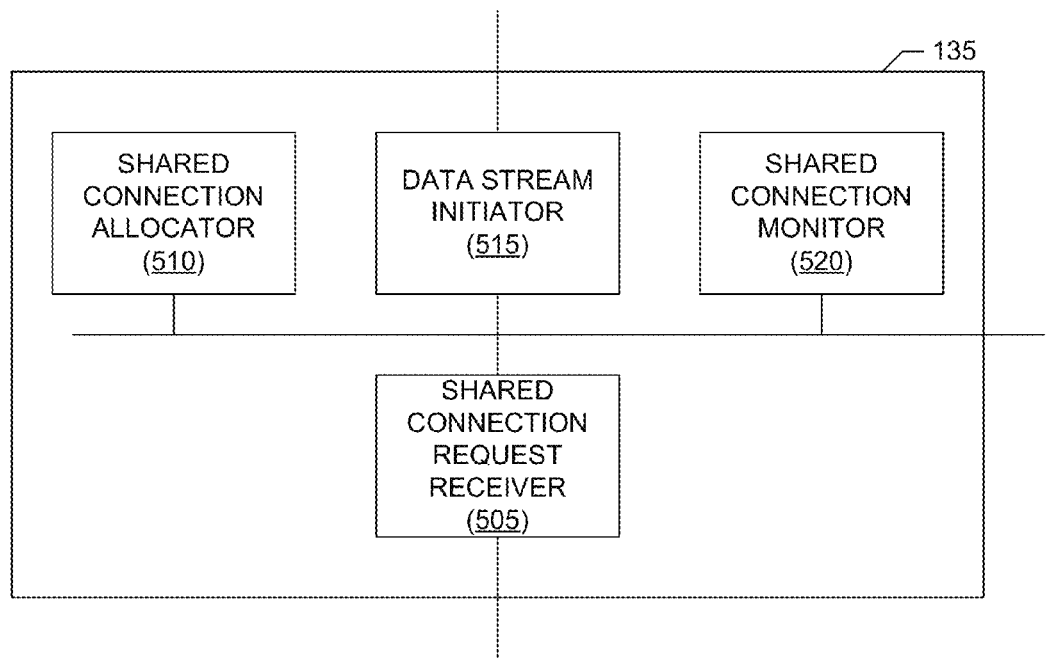
FIG. 3 is block diagram of an example connection manager that may be used to implement the example communication system of FIG. 1.

A block diagram depicting an example implementation of the connection manager 135 of FIG. 1 is illustrated in FIG. 3. The example connection manager 135 of FIG. 3 includes an example shared connection request receiver 505 to receive shared connection requests from, for example, the shared connection processor 300. As described above, a shared connection request includes, for example, data source identification information identifying a target data source, such as a data source 115, from which the shared connection processor 300 is requesting that a data stream be provided. In some examples, the shared connection request can include information indicating the number of user devices that are to be included in the shared connection among which the data stream from the identified target source is to be distributed, as described above.

The example connection manager 135 of FIG. 3 also includes an example shared connection allocator 510 to allocate data connections for the user devices to be included in a shared connection established in response to a shared connection request received by the shared connection request receiver 505. In some examples, the shared connection allocator 510 processes the shared connection request received by the shared connection request receiver 505 to determine a number of user devices to be included in the shared connection being requested (e.g., by evaluating the number of user devices indicated in the shared connection request). The shared connection allocator 510 then allocates a number of data connections corresponding to the number of user devices. The shared connection allocator 510 also generates a response to the shared connection request containing, for example, a number of network addresses (e.g., IP addresses, URIs, etc.) to be used by the user devices as destination addresses of the distribution system 120 that are to be contacted to establish the data connections for receiving the partial data streams corresponding to the target data source identified in the shared connection request. Additionally or alternatively, the shared connection allocator 510 can include a sharing code or other identifier to be used by the user devices when contacting the distribution system 120 to establish the data connections for receiving the partial data streams corresponding to the target data source identified in the shared connection request. In such examples, the sharing code is used by the shared connection allocator 510 to associated user devices with particular shared connection requests.

In some examples, the shared connection allocator 510 actively determines device capability information for the user devices to be included in the requested shared connection. For example, in response to receiving a message from a user device at a provided network address and/or including an appropriate sharing code, the shared connection allocator 510 may exchange communication messages, such as network ping messages, with the user devices to determine respective device capability information, such as bandwidth and/or data rate capabilities, network latencies, etc., for the user device. The shared connection allocator 510 then uses this device capability information to determine data transmission characteristics to be associated with the data connection established with the user devices, as described above.

The example connection manager 135 of FIG. 3 further includes an example data stream initiator 515 to initiate a data stream from the target data source identified in the shared connection request received by the shared connection request receiver 505. For example, the data stream initiator 515 can initiate data streaming or another type of data download from the target data source, and indicate that the destination of the stream is a network address that is associated with the distribution system 120 and is further associated with the particular shared connection that was established in response to the received shared connection request. In such examples, the distribution system 120 knows that a data stream received at an address associated with a particular shared connection is to be distributed into partial data streams by the distribution server 130 as disclosed herein.

In some examples, the example connection manager 135 of FIG. 3 includes an example shared connection monitor 520 to monitor the status of shared connections being used to distribute the communication of data streams among multiple user devices. For example, to monitor a shared connection associated with the user devices 105A-E, the shared connection monitor 520 can monitor for status update messages received from the shared connection processor 300 to indicate that the composition of the group of user devices 105A-E associated with the shared connection has changed (e.g., because user device(s) have entered or left the group). Additionally or alternatively, in some examples the shared connection monitor 520 can monitor that status of partial data streams being communicated to the group of user devices 105A-E associated with the shared connection to determine whether one or more of the streams has stalled (e.g., because acknowledgment(s) have not been received from one or more of the user devices 105A-E). In the illustrated example, in response to detecting a change in status of a shared connection, the shared connection monitor 520 notifies the shared connection allocator 510 to cause the shared connections with the user devices 105A-E to be updated accordingly (e.g., to add/delete user connections, to adjust the allocation of data to the different partial data streams, etc.).

Figure 4:
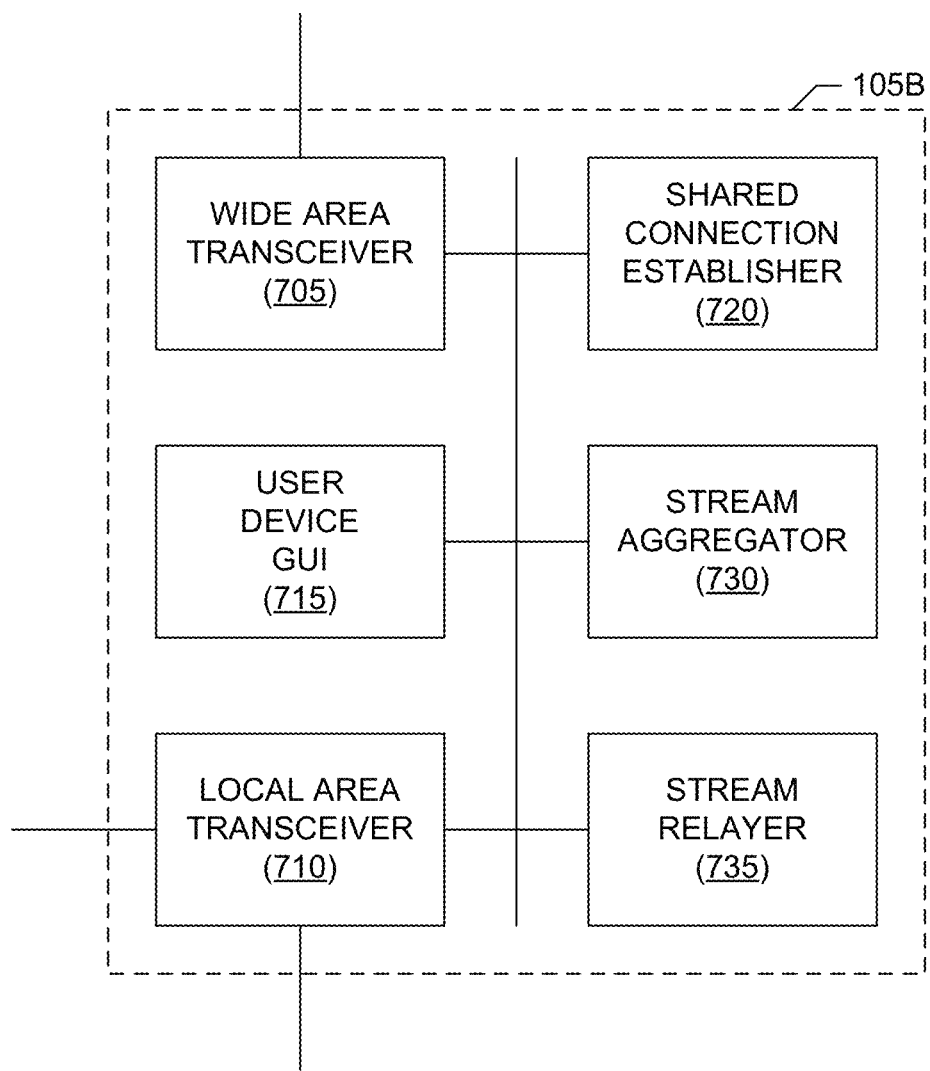
FIG. 4 is block diagram of an example user device that may be used in the example communication system of FIG. 1.
Figure 6:
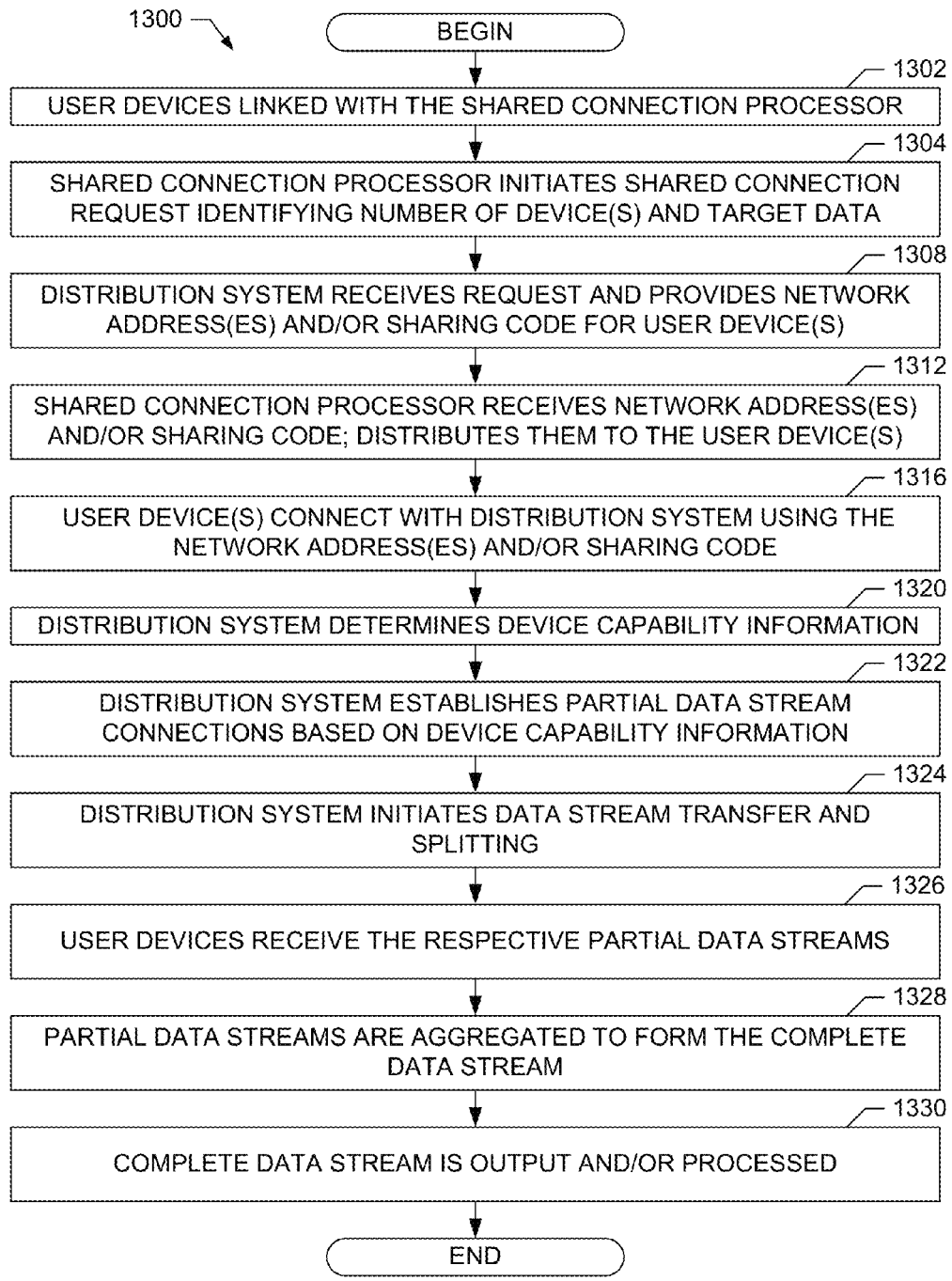
FIG. 6 is a flowchart representative of example machine readable instructions that may be executed to implement the example communication system of FIG. 1.

A block diagram depicting an example implementation of any one of the user devices 105A-E of FIGS. 1-3 is illustrated in FIG. 4. For convenience and without loss of generality, the example block diagram of FIG. 4 is described from the perspective of implementing the user device 105B, but the example of FIG. 4 could additionally or alternatively be used to implement other ones of the user devices 105A-E. Turning to FIG. 4, the example user device 105B of the illustrated example includes an example wide area transceiver 705 that implements any number and/or type(s) of wireline and/or wireless communication interfaces, protocols, etc., to communicate with one or more of service provider networks, such as the service provider network(s) 110. The user device 105B of FIG. 6 also includes an example local area transceiver 710 that implements any number and/or type(s) of wireline and/or wireless communication interfaces, protocols, etc., to implement one or more local data connections with one or more other devices, such as the shared connection processor 300. For example, the local area transceiver 710 can implement local data connections with the shared connection processor 300 via an ad-hoc network, tethering and/or any external data connection (such as a Wi-Fi connection, a Bluetooth connection, a universal serial bus (USB) connection, a docking connection, etc.).

In the illustrated example of FIG. 4, the example user device 105B also includes an example user device GUI 715 to provide an interface by which a user may cause the user device 105B to join a shared connection being established by, for example, the shared connection processor 300. For example, the user device GUI 715 can be implemented by an Internet browser, a WAP browser, a JAVA application, etc. In some examples, the user device GUI 715 provides an interface to enable a user to cause the user device 105B to announce (e.g., via data communications using the local area transceiver 710) its availability for joining a group of user devices, such as the group of devices 105A-E, to be included in a shared connection request. In some examples, the user device GUI 715 additionally or alternatively provides an interface to enable a user to initiate establishment (e.g., based on a received network address and/or sharing code, as described above) of a data connection with a distribution system, such as the distribution system 120, which is to receive a partial data stream as part of a shared connection being used to distribute a data stream among multiple user devices. In some examples, the user device GUI 715 additionally or alternatively provides an interface to enable a user to update the availability of the user device 105B for inclusion in an existing shared connection. In such examples, in response to receiving a status update via the user device GUI 715, the user device 105B can send the status update via the local area transceiver 710 to the shared connection processor 300 for reporting via its shared connection controller 640.

The example user device 105B of FIG. 4 further includes an example shared connection establisher 720 to establish a data connection with a distribution system, such as the distribution system 120, to thereby join a shared connection being used to distribute communication of a data stream among multiple devices. For example, the user device 105B may receive a network address (e.g., an IP address, URI, etc.) and/or a sharing code from the shared connection processor 300 for use in establishing a data connection with the distribution system 120 to thereby join a shared connection that was requested by the shared connection processor 300 for the purpose of distributing communication of a data stream from a target data source 115 among multiple devices, including the user device 105B. In response to receiving such a network address and/or sharing code, the shared connection establisher 720 contacts the distribution system 120 (e.g., automatically or in response to a user input received via the user device GUI 715) using the network address and/or sharing code, which causes the distribution system 120 to establish a data connection with the user device 105B, and to also associate the data connection and/or the user device 105B with the shared connection requested by the shared connection processor 300.

The example user device 105B of FIG. 4 also includes an example stream aggregator 730 and an example stream relayer 735. For example, the stream relayer 735 may be used to relay (e.g., via the local area transceiver 710) or otherwise communicate a partial data stream received via the wide area transceiver 705 of the user device 105B, and associated with a target data stream being communicated by a shared connection, to the shared connection processor 300 for aggregation to form the complete data stream. Additionally or alternatively, the stream aggregator 730 may be used to reorder and/or otherwise aggregate the partial data stream received via the wide area transceiver 705 of the user device 105B with partial data streams from one or more of the user devices 105A, C-E (e.g., received via local communication links established using the local area transceiver 810) to, for example, implement hierarchical aggregation, as described above.

A block diagram depicting an example implementation of the shared connection processor 300 of FIG. 1 is illustrated in FIG. 5. The example shared connection processor 300 of FIG. 5 is a device (e.g., such as a router, a set-top box, a computer, etc.) that is separate from the user devices 105A-E receiving the partial data streams from the distribution system 120. Turning to FIG. 5, the shared connection processor 300 of the illustrated example includes an example local area transceiver 810 that implements any number and/or type(s) of wireline and/or wireless communication interfaces, protocols, etc., to implement one or more local data connections with one or more user devices, such as the user devices 105A-E. For example, the local area transceiver 810 can implement local data connections with other user devices via tethering and/or any external data connection (such as a Wi-Fi connection, a Bluetooth connection, a universal serial bus (USB) connection, a docking connection, etc.).

The example shared connection processor 300 of FIG. 5 also includes an example processor GUI 815 to provide an interface by which a user may invoke, monitor, modify, etc., a shared connection for distributing a data stream among, for example, the multiple user devices 105A-E, as disclosed herein. For example, the processor GUI 815 can be implemented by an Internet browser, a WAP browser, a JAVA application, etc. In some examples, the processor GUI 815 provides an interface to enable a user to select a target data source, such as one of the target data source(s) 115, that is to provide the data stream whose communication is to be distributed among the multiple user devices 105A-E via the shared connection. In some examples, the processor GUI 815 also provides an interface to enable a user to select and/or otherwise identify which of the user devices 105A-E are to be included in the shared connection. For example, the processor GUI 815 can cause the shared connection processor 300 to initiate any type of automated discovery process to detect the user device(s) 105A-E that are within communication range. Additionally or alternatively, the processor GUI 815 may implement an interface to enable the user to manually enter device identification information, such as phone number(s), URI(s), etc., for the user device(s) 105A-E to be included in the shared connection. Furthermore, in some examples, the processor GUI 815 provides an interface to enable the user to initiate establishment of the shared connection via which communication of a data stream is to be distributed among the multiple user devices.

The example shared connection processor 300 of FIG. 5 further includes an example user device identifier 820 to identify the user devices, such as the user devices 105A-E, to be included in the shared connection. For example, the processor GUI 815 can initiate any type of automated discovery process to detect (e.g., via communication links established by the local area transceiver 810) the user device(s) 105A-E that are within communication range of the shared connection processor 300. Additionally or alternatively, the processor GUI 815 may receive device identification information, such as phone number(s), URI(s), etc., entered manually via the processor GUI 815 for the user device(s) 105A-E to be included in the shared connection being established by the shared connection processor 300.

The example shared connection processor 300 of FIG. 5 also includes an example shared connection requestor 825 to generate a shared connection request, as described above, to a distribution system, such as the distribution system 120, to request establishment of a shared connection via which communication of a data stream from an identified target data source is to be distributed. For example, the shared connection requestor 825 can generate a shared connection request message including target source identification information (e.g., specified via the processor GUI 815) specifying the target data source 115 from which the data stream to be distributed is to be provided. Additionally or alternatively, in some examples, the shared connection request message generated by the shared connection requestor 825 can indicate the number of user devices 105A-E to be included in the requested shared connection.

In some examples, the shared connection processor 300 does not include a wide area transceiver enabling connection with the service provider network(s) 110. In such examples, the shared connection processor 300 may establish a data path with the service provider network(s) 110 through one of the user device 105A-E. Such a data path may be used to enable the shared connection processor 300 to send the shared connection request generated by the shared connection requestor 825 and/or to receive responsive information from the distribution system 120.

The example shared connection processor 300 of FIG. 5 also includes an example stream aggregator 830 and an example stream relayer 835. For example, the stream aggregator 830 may receive, via the local communication links established using the local area transceiver 810, the partial streams from one or more, or all, of the user device 105A-E included in a shared connection. As described above, the partial streams each form a part of the complete data stream being provided by the target data source 115. The stream aggregator 830 then aggregates the partial streams (e.g., possibly after reordering to account for different data packet arrival times at the different user devices 105A-E) to form the complete data stream being provided by the target data source 115. In such examples, the stream relayer 825 may forward the resulting complete data stream to, for example, the output device 125 for further processing, presentation, etc.

The example shared connection processor 300 of FIG. 5 further includes an example shared connection controller 840 to monitor and/or otherwise control the shared connection established in response to the shared connection request generated and sent by the shared connection requestor 825. For example, the shared connection controller 840 can detect, via data communications exchanged via the local area transceiver 810, one or more user devices, such as one or more of the user devices 105A-E, entering or leaving an operating area, or otherwise becoming available or unavailable. Additionally or alternatively, the shared connection controller 840 can interface with the processor GUI 815 to enable a user to manually enter changes in the composition of the user devices 105A-E to be included in the shared connection via which communication of the data stream provided by the target data source 115 is to be distributed. The shared connection controller 840 can then report such changes in the composition of the user devices 105A-E associated with the existing shared connection to enable the distribution system 120 to modify the shared connection accordingly.

While example manners of implementing the example communication system 100, the example user devices 105A-E, the example service provider network(s) 110, the example data source(s) 115, the example distribution system 120, the example output device 125, the example distribution server 130, the example connection manager 135, the example shared connection processor 300, the example data receiver 405, the example stream splitter 410, the example transcoder 415, the example shared connection request receiver 505, the example shared connection allocator 510, the example data stream initiator 515, the example shared connection monitor 520, the example wide area transceiver 705, the example local are transceiver 710, the example user device GUI 715, the example shared connection establisher 720, the example stream aggregator 730, the example stream relayer 735, the example local area transceiver 810, the example processor GUI 815, the example user device identifier 820, the example shared connection requestor 825, the example stream aggregator 830, the example stream relayer 835 and the example shared connection controller 840 have been illustrated in FIGS. 1-5, one or more of the elements, processes and/or devices illustrated in FIGS. 1-5 may be combined, divided, re-arranged, omitted, eliminated and/or implemented in any other way. Further, the example user devices 105A-E, the example service provider network(s) 110, the example data source(s) 115, the example distribution system 120, the example output device 125, the example distribution server 130, the example connection manager 135, the example shared connection processor 300, the example data receiver 405, the example stream splitter 410, the example transcoder 415, the example shared connection request receiver 505, the example shared connection allocator 510, the example data stream initiator 515, the example shared connection monitor 520, the example wide area transceiver 705, the example local are transceiver 710, the example user device GUI 715, the example shared connection establisher 720, the example stream aggregator 730, the example stream relayer 735, the example local area transceiver 810, the example processor GUI 815, the example user device identifier 820, the example shared connection requestor 825, the example stream aggregator 830, the example stream relayer 835, the example shared connection controller 840 and/or, more generally, the example communication system 100 of FIGS. 1-5 may be implemented by hardware, software, firmware and/or any combination of hardware, software and/or firmware. Thus, for example, any of the example user devices 105A-E, the example service provider network(s) 110, the example data source(s) 115, the example distribution system 120, the example output device 125, the example distribution server 130, the example connection manager 135, the example shared connection processor 300, the example data receiver 405, the example stream splitter 410, the example transcoder 415, the example shared connection request receiver 505, the example shared connection allocator 510, the example data stream initiator 515, the example shared connection monitor 520, the example wide area transceiver 705, the example local are transceiver 710, the example user device GUI 715, the example shared connection establisher 720, the example stream aggregator 730, the example stream relayer 735, the example local area transceiver 810, the example processor GUI 815, the example user device identifier 820, the example shared connection requestor 825, the example stream aggregator 830, the example stream relayer 835, the example shared connection controller 840 and/or, more generally, the example communication system 100 could be implemented by one or more circuit(s), programmable processor(s), application specific integrated circuit(s) (ASIC(s)), programmable logic device(s) (PLD(s)) and/or field programmable logic device(s) (FPLD(s)), etc. When any of the apparatus or system claims of this patent are read to cover a purely software and/or firmware implementation, at least one of the example communication system 100, the example user devices 105A-E, the example service provider network(s) 110, the example data source(s) 115, the example distribution system 120, the example output device 125, the example distribution server 130, the example connection manager 135, the example shared connection processor 300, the example data receiver 405, the example stream splitter 410, the example transcoder 415, the example shared connection request receiver 505, the example shared connection allocator 510, the example data stream initiator 515, the example shared connection monitor 520, the example wide area transceiver 705, the example local are transceiver 710, the example user device GUI 715, the example shared connection establisher 720, the example stream aggregator 730, the example stream relayer 735, the example local area transceiver 810, the example processor GUI 815, the example user device identifier 820, the example shared connection requestor 825, the example stream aggregator 830, the example stream relayer 835 and/or the example shared connection controller 840 are hereby expressly defined to include a tangible computer readable medium such as a memory, digital versatile disk (DVD), compact disk (CD), Blu-ray Disc™ etc., storing such software and/or firmware. Further still, the examples of FIGS. 1-5 may include one or more elements, processes and/or devices in addition to, or instead of, those illustrated in FIGS. 1-5, and/or may include more than one of any or all of the illustrated elements, processes and devices.

Flowcharts representative of example machine readable instructions for implementing the example communication system 100, the example user devices 105A-E, the example service provider network(s) 110, the example data source(s) 115, the example distribution system 120, the example output device 125, the example distribution server 130, the example connection manager 135, the example shared connection processor 300, the example data receiver 405, the example stream splitter 410, the example transcoder 415, the example shared connection request receiver 505, the example shared connection allocator 510, the example data stream initiator 515, the example shared connection monitor 520, the example wide area transceiver 705, the example local are transceiver 710, the example user device GUI 715, the example shared connection establisher 720, the example stream aggregator 730, the example stream relayer 735, the example local area transceiver 810, the example processor GUI 815, the example user device identifier 820, the example shared connection requestor 825, the example stream aggregator 830, the example stream relayer 835 and/or the example shared connection controller 840 are shown in FIGS. 6-9. In these examples, the machine readable instructions represented by each flowchart may comprise one or more programs for execution by a processor, such as the processor 1812 shown in the example processing system 1800 discussed below in connection with FIG. 10. The one or more programs, or portion(s) thereof, may be embodied in software stored on a tangible computer readable medium such as a CD-ROM, a floppy disk, a hard drive, a digital versatile disk (DVD), a Blu-ray Disc™, or a memory associated with the processor 1812, but the entire program or programs and/or portions thereof could alternatively be executed by a device other than the processor 1812 (e.g., such as a controller and/or any other suitable device) and/or embodied in firmware or dedicated hardware (e.g., implemented by an ASIC, a PLD, an FPLD, discrete logic, etc.). Also, one or more of the machine readable instructions represented by the flowchart of FIGS. 6-9 may be implemented manually. Further, although the example machine readable instructions are described with reference to the flowcharts illustrated in FIGS. 6-9, many other methods of implementing the example communication system 100, the example user devices 105A-E, the example service provider network(s) 110, the example data source(s) 115, the example distribution system 120, the example output device 125, the example distribution server 130, the example connection manager 135, the example shared connection processor 300, the example data receiver 405, the example stream splitter 410, the example transcoder 415, the example shared connection request receiver 505, the example shared connection allocator 510, the example data stream initiator 515, the example shared connection monitor 520, the example wide area transceiver 705, the example local are transceiver 710, the example user device GUI 715, the example shared connection establisher 720, the example stream aggregator 730, the example stream relayer 735, the example local area transceiver 810, the example processor GUI 815, the example user device identifier 820, the example shared connection requestor 825, the example stream aggregator 830, the example stream relayer 835 and/or the example shared connection controller 840 may alternatively be used. For example, with reference to the flowcharts illustrated in FIGS. 6-9, the order of execution of the blocks may be changed, and/or some of the blocks described may be changed, eliminated, combined and/or subdivided into multiple blocks.

As mentioned above, the example processes of FIGS. 6-9 may be implemented using coded instructions (e.g., computer readable instructions) stored on a tangible computer readable medium such as a hard disk drive, a flash memory, a read-only memory (ROM), a CD, a DVD, a cache, a random-access memory (RAM) and/or any other storage media in which information is stored for any duration (e.g., for extended time periods, permanently, brief instances, for temporarily buffering, and/or for caching of the information). As used herein, the term tangible computer readable medium is expressly defined to include any type of computer readable storage and to exclude propagating signals. Additionally or alternatively, the example processes of FIGS. 6-9 may be implemented using coded instructions (e.g., computer readable instructions) stored on a non-transitory computer readable medium, such as a flash memory, a ROM, a CD, a DVD, a cache, a random-access memory (RAM) and/or any other storage media in which information is stored for any duration (e.g., for extended time periods, permanently, brief instances, for temporarily buffering, and/ or for caching of the information). As used herein, the term non-transitory computer readable medium is expressly defined to include any type of computer readable medium and to exclude propagating signals. Also, as used herein, the terms "computer readable" and "machine readable" are considered equivalent unless indicated otherwise. Furthermore, as used herein, when the phrase "at least" is used as the transition term in a preamble of a claim, it is open-ended in the same manner as the term "comprising" is open ended. Thus, a claim using "at least" as the transition term in its preamble may include elements in addition to those expressly recited in the claim.

Example machine readable instructions 1300 that may be executed to implement the example communication system 100 of FIG. 1 are represented by the flowchart shown in FIG. 600. With reference to the preceding figures and associated descriptions, the machine readable instructions 1300 of FIG. 6 begin execution at block 1302 at which the user devices 105A-E are linked to the shared connection processor 300 via, for example, an ad-hoc network, tethering connections and/or other communication links, as described above. At block 1304, the shared connection processor 300 initiates a shared connection request to the distribution system 120, as described above. In the illustrated example of FIG. 6, the shared connection request includes information identifying a number of user devices 105A-E to be included in the shared connection being requested. The shared connection request initiated at block 1304 also includes information identifying the target data (e.g., the target data source 115) that is to provide the data stream whose communication is to be distributed among the user devices 105A-E identified by the shared connection request.

At block 1308, the distribution system 120 receives the shared connection request from the shared connection processor 300 and uses the number of user devices indicated in the request to determine a number of network addresses to be provided to the user devices 105A-E for use in establishing data connections with the distribution system 120, as described above. In some examples, at block 1308 the distribution system 120 additionally or alternatively determines a sharing code to be used to associate user devices with the shared connection being requested, as described above. At block 1308, the distribution system 120 provides the network addresses and/or the sharing code to the shared connection processor 300.

At block 1312, the shared connection processor 300 receives the network addresses and/or the sharing code provided by the distribution system 120 in response to the shared connection request initiated at block 1304. As described above, the shared connection processor 300 distributes the received network addresses and/or sharing code to the user devices 105A-E via the local communication links established at block 1302. At block 1316, the user devices 105A-E use the network addresses and/or sharing code received from the shared connection processor 300 to contact the distribution system 120 to thereby establish respective data connections with the user devices 105A-E, as described above, via which communication of a data stream is be distributed. At block 1320, the distribution system 120 determines device capability information for the user devices 105A-E to be included in the requested shared connection. For example, and as described above, the distribution system 120 may exchange communication messages, such a network ping messages, with the user devices 105A-E to determine respective device capability information, such as bandwidth and/or data rate capabilities, network latencies, etc., for the user devices 105A-E.

At block 1322, the distribution system 120 associates data transmission characteristics with the data connections to complete establishment of the data connections with the user devices 105A-E. As described above, the data transmission characteristics determined for the respective data connections are based on the device capability information obtained for the respective user devices 105A-E, thereby causing each data connections to be tailored to its respective user device 105A-E. As described above, the data connections established with the user devices 105A-E are used to convey the partial data streams associated with a complete data stream to the user devices 105A-E.

At block 1324, the distribution system 120 initiates the transfer of the data stream from the target data source 115 identified in the shared connection request, and splits the complete data stream into partial data streams to be communicated to the user devices 105A-E via the established data connections, as described above. At block 1326, the user devices 105A-E receive their respective partial data streams via their respective data connections with the distribution system 120. At block 1328, the partial data streams are provided to and aggregated by the shared connection processor 300, as described above, to form the complete data stream being provided by the target data source 115. At block 1330, the complete data stream formed by aggregating the partial data streams is output to, for example, the output device 125.

Figure 7:
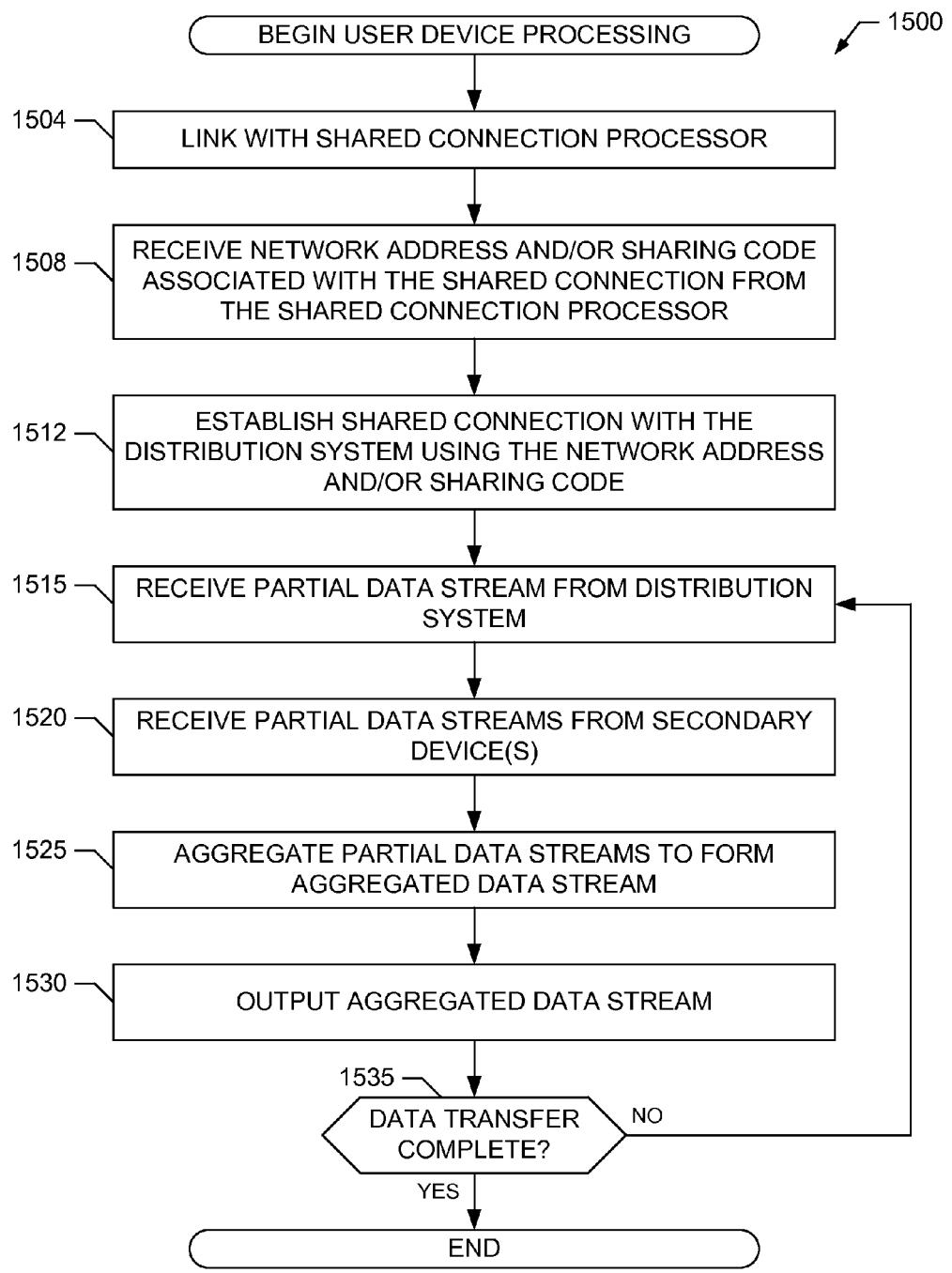
FIG. 7 is a flowchart representative of example machine readable instructions that may be executed to implement the example user device of FIG. 4.

Example machine readable instructions 1500 that may be executed to implement one or more of the example user devices 105A-E of FIGS. 1 and/or 4 are represented by the flowchart shown in FIG. 7. For convenience, and without loss of generality, execution of the machine readable instructions 1500 is described in the context of the user device 105B operating in the example communication system 100 of FIG. 1. Turning to FIG. 7, and with reference to the preceding figures and associated descriptions, the machine readable instructions 1500 begin execution at block 1504 at which the user device 105B uses its local area transceiver 710 to establish a local communication link with the shared connection processor 300 of FIG. 1, as described above. At block 1508, the shared connection establisher 720 of the user device 105B receives a network address and/or a sharing code from the shared connection processor 300 for use in establishing a data connection with the distribution system 120, as described above. At block 1512, the shared connection establisher 720 establishes the data connection with the distribution system 120 using the received network address and/or sharing code, as described above.

At block 1515, the user device 105B begins receiving, via its wide area transceiver 705, a partial data stream corresponding to a portion of the complete data stream being provided by a target data source 115 (e.g., which is the subject of the shared connection in which the user device 105B has joined). In some examples, such as examples supporting hierarchical aggregation, at block 1520, the stream aggregator 730 of the user device 105B receives, via local communication links established using its local area transceiver 710, the partial data stream(s) received by one or more of the other user devices 105A, C-E included in the shared connection. At block 1525, the stream aggregator 730 aggregates, as described above, the partial data streams (e.g., possibly after reordering to account for different data packet arrival times at the different user devices 105A-E) to form, for example, an intermediate aggregated data stream corresponding to a portion of the complete data stream being provided by the target data source 115. At block 1530, the stream relayer 735 of the user device 105B outputs the intermediate aggregated data stream for use by another device, such as the shared connection processor 300, to complete the hierarchical aggregation process. If the transfer of the data stream is not complete and, thus, the data stream is still being communicated (block 1535), then processing then returns to block 1515 and blocks subsequent thereto at which the user device 105B continues to receive its partial data stream corresponding to its portion of the complete data stream being provided by the target data source 115 (although the data transmission characteristic(s) of the partial data stream may be modified by the distribution system 120 in response to changes in the status of the shared connection, as described above).

Figure 8:
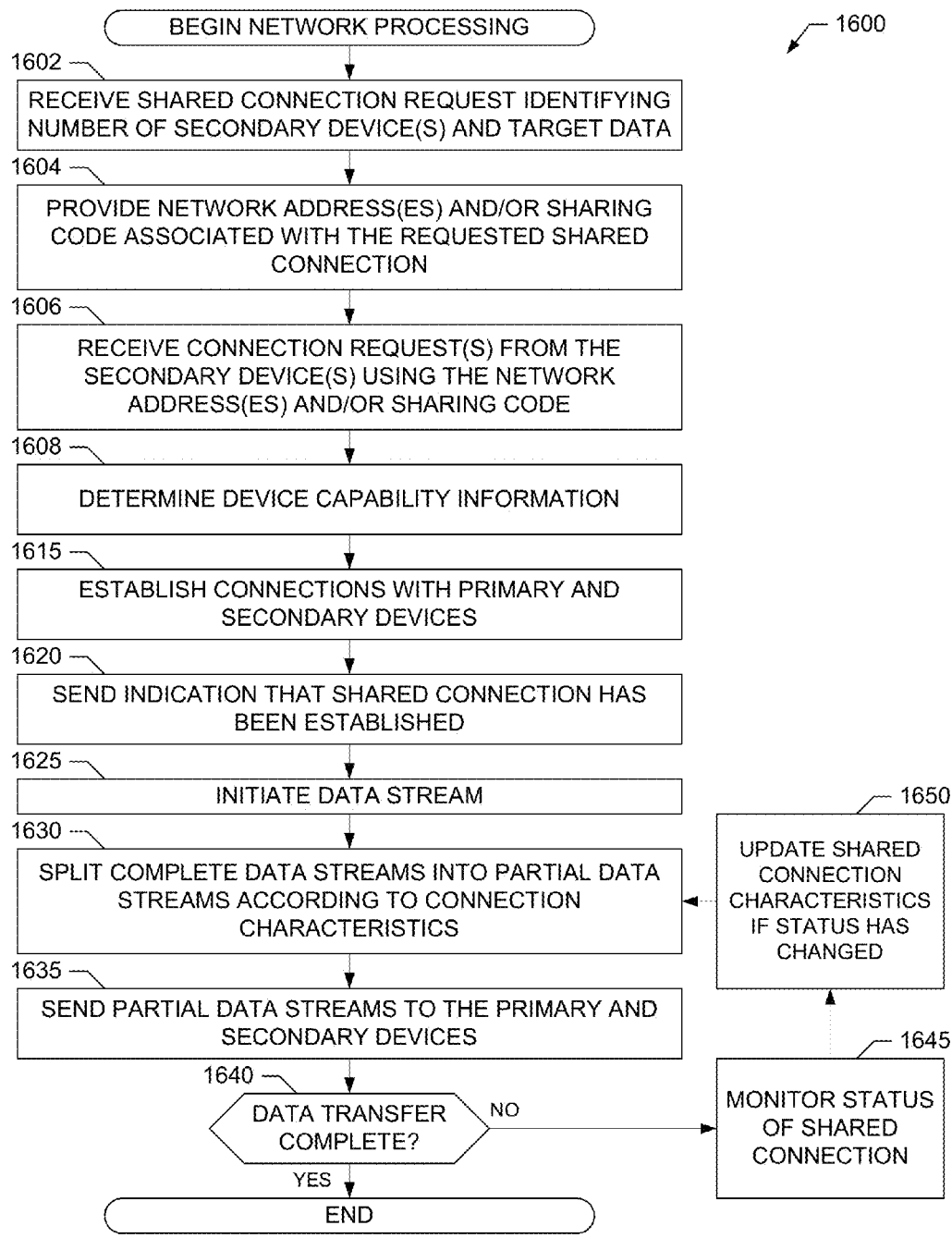
FIG. 8 is a flowchart representative of example machine readable instructions that may be executed to implement the example distribution server of FIG. 2 and/or the example connection manager of FIG. 3.

Example machine readable instructions 1600 that may be executed to implement the example distribution system 120 and, more particularly, the example distribution server 130 and/or the example connection manager 135 of FIGS. 1-3 are represented by the flowchart shown in FIG. 8. For convenience, and without loss of generality, execution of the machine readable instructions 1600 is described in the context of the distribution server 130 and the connection manager 135 operating in the example communication system 100 of FIG. 1. Turning to FIG. 8, and with reference to the preceding figures and associated descriptions, the machine readable instructions 1600 begin execution at block 1602 at which the shared connection request receiver 505 of the connection manager 135 receives a shared connection request from the shared connection processor 300, as described above. In the illustrated example, the shared connection request includes information identifying the number of user devices 105A-E to be included in the shared connection. In the illustrated example, the shared connection request received at block 1602 also includes data source identification information identifying a target data source 115 that is to provide a data stream whose communication is to be distributed using the requested shared connection.

At block 1604, the shared connection allocator 510 provides one or more network addresses and/or a sharing code to the shared connection processor 300 in response to the received shared connection request. For example, and a described above, the shared connection allocator 510 may provide a number of network addresses corresponding to the number of user devices 105A-E indicated in the shared connection request, where each network address is associated with a respective data connection to be established with one of the user devices 105A-E. In some examples, the shared connection allocator 510 provides the sharing code in addition or as an alternative to the network addresses, where the sharing code is to be used by the user devices 105A-E to indicate that they belong to a particular, requested shared connection. At block 1606, the shared connection allocator 510 receives connection requests from the user devices 105A-E at the provided network address(es) and/or including the provided sharing code, and establishes respective data connections with the user devices 105A-E in response to receiving the requests, as described above. At block 1608, the shared connection allocator 510 actively determines device capability information for the user devices 105A-E to be included in the requested shared connection by, for example, exchanging communication messages, such a network ping messages, with each user device 105A-E to determine/measure device capability information, such as bandwidth and/or data rate capabilities, network latencies, etc.

At block 1615, the shared connection allocator 510 establishes respective data connections with the user devices 105A-E by associated respective data transmission capabilities with the initial data connection established with the user devices 105A-E by the service provider network 110, as described above. For example, the data transmission capabilities to be associated with each data connection can be determined by the shared connection allocator 510 using the device capability information obtained for the particular user device associated with the data connection, as further described above.

At block 1620, the connection manager 135 sends an indication to the shared connection processor 300 that the shared connection has been established in response to the request received at block 1602. At block 1625, the data stream initiator 515 of the connection manager 135 initiates transfer of a data stream from the target data source 115 using the source identification information included in the request received at block 1602. At block 1630, the data receiver 405 of the distribution server 130 receives the data stream from the target data source 115, and the stream splitter 410 of the distribution server 130 splits the incoming data stream into partial data streams according to the data transmission characteristics associated with the respective data connections established with the user devices 105A-E, as described above. In some examples, at block 1630, the transcoder 415 of the distribution server 130 may be invoked to perform transcoding of the partial data streams to conform them to the capabilities of the user devices 105A-E. At block 1635, the stream splitter 410 sends the partial data streams to the user devices 105A-E using the established data connections, as described above.

If the transfer of the data stream is not complete and, thus, the data stream is still being received and split by the distribution server 130 (block 1640), then at block 1645, the shared connection monitor 520 of the connection manager 135 monitors the status of the shared connection, as described above. At block 1650, the shared connection allocator 510 updates the shared connection characteristics, as appropriate, in response to any detected changes in the status of the shared connection. For example, the shared connection allocator 510 may cause removal of the data connection(s) for any user device(s) 105A-E that are no longer available, establishment of new data connection(s) for new user device(s) that become available, modification of data transmission characteristics associated with one or more of the established data connections based on detection of changes to the device capability, link status, etc., and/or any other appropriate change to the shared connection. Processing then returns to block 1630 and blocks subsequent thereto at which the distribution server 120 continues to receive the incoming data stream and to split it into its component partial data streams for sending to the user devices 105A-E (although the data transmission characteristic(s) of the partial data stream may be modified in response to status update(s) received via the processing at block 1650).

Figure 9:
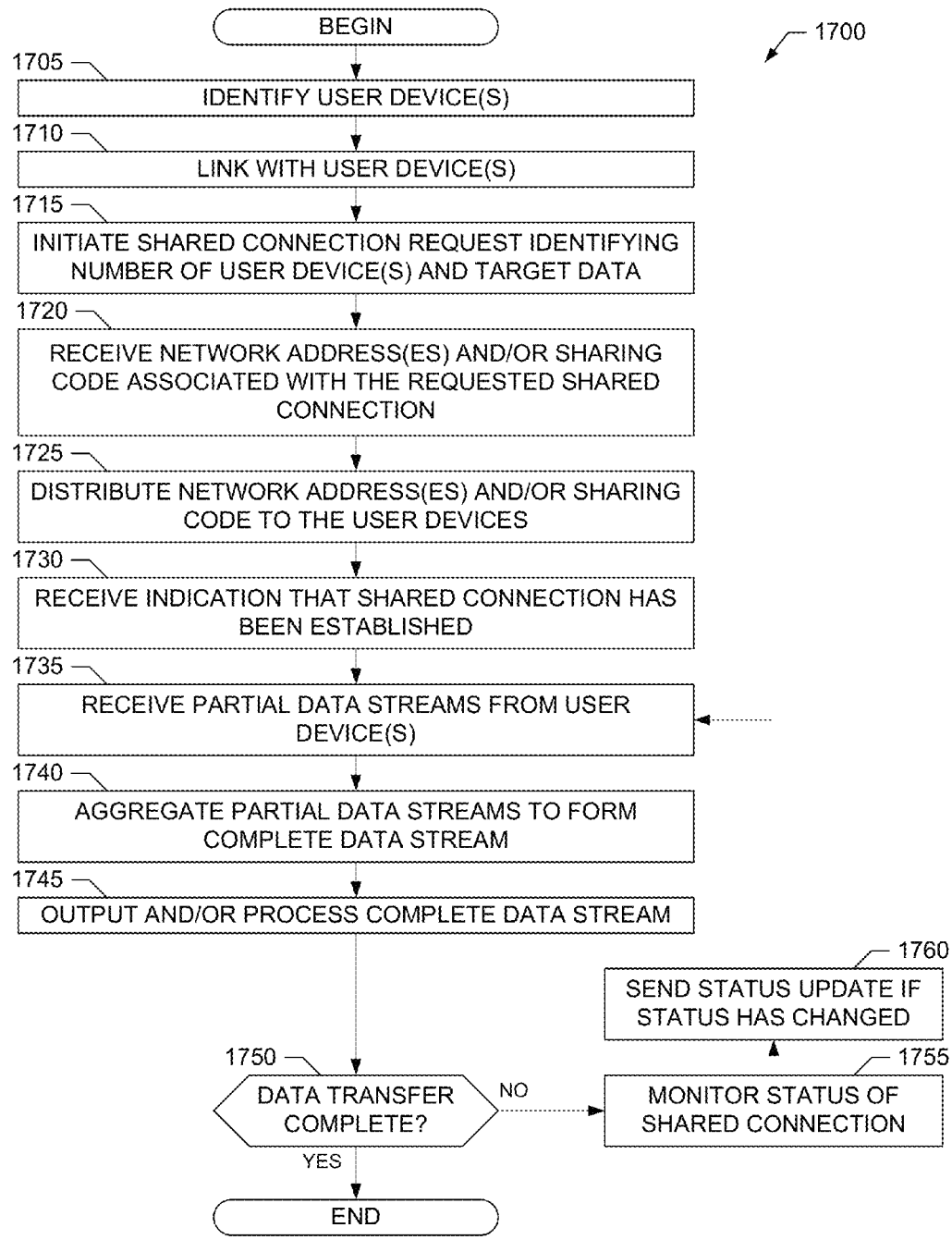
FIG. 9 is a flowchart representative of example machine readable instructions that may be executed to implement the example shared connection processor of FIGS. 1 and/or 5.

Example machine readable instructions 1700 that may be executed to implement the example shared connection processor 300 of FIGS. 1 and 5 are represented by the flowchart shown in FIG. 9. For convenience, and without loss of generality, execution of the machine readable instructions 1700 is described in the context of the shared connection processor 300 operating in the example communication system 100 of FIG. 1. With reference to the preceding figures and associated descriptions, the machine readable instructions 1700 of FIG. 9 begin execution at block 1705 at which the user device identifier 820 of the shared connection processor 300 identifies the user devices 105A-E that are to be included in a shared connection for distributing communication of a data stream from a target data source 115. For example, at block 1705, the user device identifier 820 can use an auto-discovery procedure, information entered via the processor device GUI 815, etc., to identify the user devices 105A-E, as described above. At block 1710, the shared connection processor 300 uses its local area transceiver 810 to establish local communication links, such as tethering links, an ad-hoc network, etc., with the user devices 105A-E identified at block 1705.

At block 1715, the shared connection requestor 825 of the shared connection processor 300 generates and sends a shared connection request to the distribution system 120 to request a shared connection for distributing communication of a data stream being provided by an identified target data source 115. In the illustrated example of FIG. 9, the shared connection request includes information identifying the number of user devices 105A-E to be included in the shared connection being requested. The shared connection request initiated at block 1715 also includes information identifying the target data source (e.g., the target data source 115) that is to provide the data stream whose communication is to be distributed among the user devices 105A-E. In some examples, the shared connection processor 300 sends the shared connection request to one of the user devices 105A-E via a local communication link established at block 1710, and the user device forwards the request to the distribution system 120 (or, in other words, the shared connection processor 300 establishes a data path to the distribution system 120 using one of the user devices 105A-E).

At block 1720, the shared connection requestor 825 of the shared connection processor 300 receives one or more network addresses and/or a sharing code from the distribution system 120 in response to the shared connection request initiated at block 1715, as described above. In some examples, the shared connection processor 300 receives the network address(es) and/or sharing code by way of a data path through the user device 105A-E that sent the shared connection request, on behalf of the shared connection processor 300, to the distribution system 120. At block 1725, the shared connection requestor 825 distributes (e.g., via the local communication links established at block 1710) the network addresses and/or the sharing code to the user devices 105A-E to be included in the shared connection, as described above. For example, the number of network addresses received at block 1720 may correspond to the number of user devices 105A-E indicated in the shared connection request. In such examples, the shared connection requestor 825 of the shared connection processor 300 may forward a different network address to each respective user device 105A-E. As noted above, the network addresses and/or sharing code distributed to the user devices 105A-E are used by the user devices 105A-E to establish respective data connections with the distribution system 120.

At block 1730, the shared connection processor 300 receives an indication from the distribution system 120 (e.g., via a data path through one of the user device 105A-E, such as the user device used to send the shared connection request and receive the network address(es) and/or sharing code) indicating that the requested shared connection has been established. For example, the distribution system 120 may send such an indication after the user devices 105A-E have contacted the distribution system 120 using the provided network address(es) and/or sharing code, and their respective data connections have been established.

After the shared connection is established, at block 1735, the stream aggregator 830 of the shared connection processor 300 receives, via the local communication links established at block 1710, the partial data streams received by the user devices 105A-E included in the shared connection. At block 1740, the stream aggregator 830 aggregates, as described above, the partial data streams (e.g., possibly after reordering to account for different data packet arrival times at the different user devices 105A-E) to form the complete data stream being provided by the target data source 115. At block 1745, the shared connection processor 300 performs any appropriate post-processing on the aggregated, complete data stream, and/or the stream relayer 835 of the shared connection processor 300 outputs the complete data stream for use by another device, such as the output device 125.

If the transfer of the data stream is not complete and, thus, the data stream is still being communicated (block 1750), then at block 1755, the shared connection controller 840 of the shared connection processor 300 monitors the status of the shared connection, as described above. For example, the shared connection controller 840 can detect changes in the composition (e.g., membership) of the group of user devices 105A-E (e.g., such as when device(s) enter and/or leave an operating area) automatically (e.g., via communications exchanged using the local area transceiver 810) and/or manually (e.g., via information entered via the processor GUI 815). At block 1760, the shared connection controller 840 sends (e.g., via a data path through one of the user device 105A-E, such as the user device used to send the shared connection request and receive the network address(es) and/or sharing code) any status updates to the distribution system 120. Processing then returns to block 1735 and blocks subsequent thereto at which the shared connection processor 300 continues to receive and aggregate the partial data streams received from the user devices 105A-E.

Figure 10:
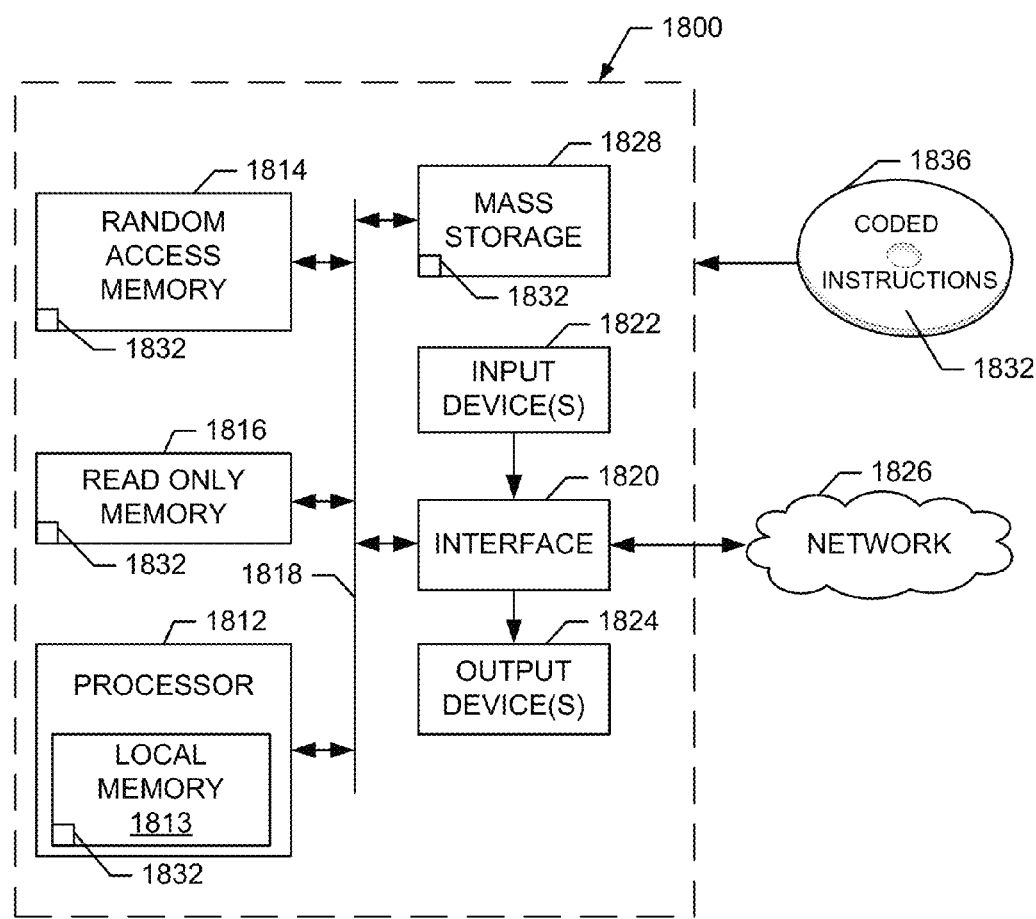
FIG. 10 is a block diagram of an example processing system that may execute the example machine readable instructions of FIGS. 6-8 and/or 9 to implement the example communication system of FIG. 1, the example shared connection processor of FIGS. 1 and/or 5, the example distribution server of FIG. 2, the example connection manager of FIG. 3 and/or the example user device of FIG. 4.

FIG. 10 is a block diagram of an example processing system 1800 capable of executing the instructions of FIGS. 6-9 to implement the first example communication system 100, the example user devices 105A-E, the example service provider network(s) 110, the example data source(s) 115, the example distribution system 120, the example output device 125, the example distribution server 130, the example connection manager 135, the example shared connection processor 300, the example data receiver 405, the example stream splitter 410, the example transcoder 415, the example shared connection request receiver 505, the example shared connection allocator 510, the example data stream initiator 515, the example shared connection monitor 520, the example wide area transceiver 705, the example local are transceiver 710, the example user device GUI 715, the example shared connection establisher 720, the example stream aggregator 730, the example stream relayer 735, the example local area transceiver 810, the example processor GUI 815, the example user device identifier 820, the example shared connection requestor 825, the example stream aggregator 830, the example stream relayer 835 and/or the example shared connection controller 840 of FIGS. 1-5. The processing system 1800 can be, for example, a server, a personal computer, a mobile phone (e.g., a smartphone, a cell phone, etc.), a personal digital assistant (PDA), an Internet appliance, a DVD player, a CD player, a digital video recorder, a Blu-ray player, a gaming console, a personal video recorder, a set top box, a digital camera, or any other type of computing device.

The system 1800 of the instant example includes a processor 1812. For example, the processor 1812 can be implemented by one or more microprocessors and/or controllers from any desired family or manufacturer.

The processor 1812 includes a local memory 1813 (e.g., a cache) and is in communication with a main memory including a volatile memory 1814 and a non-volatile memory 1816 via a bus 1818. The volatile memory 1814 may be implemented by Static Random Access Memory (SRAM), Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1816 may be implemented by flash memory and/or any other desired type of memory device. Access to the main memory 1814, 1816 is controlled by a memory controller.

The processing system 1800 also includes an interface circuit 1820. The interface circuit 1820 may be implemented by any type of interface standard, such as an Ethernet interface, a universal serial bus (USB), and/or a PCI express interface.

One or more input devices 1822 are connected to the interface circuit 1820. The input device(s) 1822 permit a user to enter data and commands into the processor 1812. The input device(s) can be implemented by, for example, a keyboard, a mouse, a touchscreen, a track-pad, a trackball, a trackbar (such as an isopoint), a voice recognition system and/or any other human-machine interface.

One or more output devices 1824 are also connected to the interface circuit 1820. The output devices 1824 can be implemented, for example, by display devices (e.g., a liquid crystal display, a cathode ray tube display (CRT)), a printer and/or speakers. The interface circuit 1820, thus, typically includes a graphics driver card.

The interface circuit 1820 also includes a communication device, such as a modem or network interface card, to facilitate exchange of data with external computers via a network 1826 (e.g., an Ethernet connection, a digital subscriber line (DSL), a telephone line, coaxial cable, a cellular telephone system, etc.).

The processing system 1800 also includes one or more mass storage devices 1828 for storing machine readable instructions and data. Examples of such mass storage devices 1828 include floppy disk drives, hard drive disks, compact disk drives and digital versatile disk (DVD) drives.

Coded instructions 1832 corresponding to the instructions of FIGS. 6-9 may be stored in the mass storage device 1828, in the volatile memory 1814, in the non-volatile memory 1816, in the local memory 1813 and/or on a removable storage medium, such as a CD or DVD 1836.

At least some of the above described example methods and/or apparatus are implemented by one or more software and/or firmware programs running on a computer processor. However, dedicated hardware implementations including, but not limited to, application specific integrated circuits, programmable logic arrays and other hardware devices can likewise be constructed to implement some or all of the example methods and/or apparatus described herein, either in whole or in part. Furthermore, alternative software implementations including, but not limited to, distributed processing or component/object distributed processing, parallel processing, or virtual machine processing can also be constructed to implement the example methods and/or apparatus described herein.

To the extent the above specification describes example components and functions with reference to particular standards and protocols, it is understood that the scope of this patent is not limited to such standards and protocols. For instance, each of the standards for Internet and other packet switched network transmission (e.g., Transmission Control Protocol (TCP)/Internet Protocol (IP), User Datagram Protocol (UDP)/IP, HyperText Markup Language (HTML), HyperText Transfer Protocol (HTTP)) represent examples of the current state of the art. Such standards are periodically superseded by faster or more efficient equivalents having the same general functionality. Accordingly, replacement standards and protocols having the same functions are equivalents which are contemplated by this patent and are intended to be included within the scope of the accompanying claims.

Additionally, although this patent discloses example systems including software or firmware executed on hardware, it should be noted that such systems are merely illustrative and should not be considered as limiting. For example, it is contemplated that any or all of these hardware and software components could be embodied exclusively in hardware, exclusively in software, exclusively in firmware or in some combination of hardware, firmware and/or software. Accordingly, while the above specification described example systems, methods and articles of manufacture, the examples are not the only way to implement such systems, methods and articles of manufacture. Therefore, although certain example methods, apparatus and articles of manufacture have been described herein, the scope of coverage of this patent is not limited thereto. On the contrary, this patent covers all methods, apparatus and articles of manufacture fairly falling within the scope of the claims either literally or under the doctrine of equivalents.

What is claimed is:

1. A method to distribute communication of a first data stream among multiple devices, the method comprising:
sending, from a first device, a first request to a distribution system to establish a shared connection to distribute the communication of the first data stream among a plurality of devices, the first device being separate from the plurality of devices;
receiving, at the first device in response to the first request sent to the distribution system, a plurality of network addresses of the distribution system assigned by the distribution system to the first request and a sharing code assigned by the distribution system particularly to the first request, the sharing code to associate the plurality of devices with the shared connection corresponding to the first request, the plurality of network addresses allocated to the plurality of devices for sending subsequent requests to the distribution system to establish respective data connections with the distribution system to carry respective partial data streams forming the first data stream;
distributing the network addresses from the first device to the plurality of devices to be used by the plurality of devices to establish the respective data connections with the distribution system;
distributing the sharing code from the first device to the plurality of devices for inclusion in the subsequent requests to be sent from the respective ones of the plurality of devices to the distribution system to establish the respective data connections with the distribution system; and
aggregating, at the first device, the respective partial data streams received by the plurality of devices via the respective data connections to form the first data stream.

2. The method of claim 1, further including:
identifying the plurality of devices via which the communication of the first data stream is to be distributed; and
establishing respective communication links with the plurality of devices via which the respective partial data streams are to be received from the plurality of devices.

3. The method of claim 1, wherein a number of network addresses received corresponds to a number of devices indicated in the first request as being included in the shared connection.

4. The method of claim 1, further including receiving the partial data streams via communication links established with the plurality of devices.

5. The method of claim 1, further including providing the first data stream formed by aggregating the partial data streams to a presentation device.

6. The method of claim 1, further including:
detecting a change in membership of the plurality of devices; and
reporting the change.

7. A tangible machine readable medium including machine readable instructions which, when executed, cause a first device to perform operations comprising:
sending a first request to a distribution system to establish a shared connection to distribute communication of a first data stream among a plurality of devices, the first device being separate from the plurality of devices;
receiving, in response to the first request sent to the distribution system, a plurality of network addresses of the distribution system assigned by the distribution system to the first request and a sharing code assigned by the distribution system particularly to the first request, the sharing code to associate the plurality of devices with the shared connection corresponding to the first request, the plurality of network addresses allocated to the plurality of devices for sending subsequent requests to the distribution system to establish respective data connections with the distribution system to carry respective partial data streams forming the first data stream;
distributing the network addresses to the plurality of devices to be used by the plurality of devices to establish the respective data connections with the distribution system;
distributing the sharing code to the plurality of devices for inclusion in the subsequent requests to be sent from the respective ones of the plurality of devices to the distribution system to establish the respective data connections with the distribution system; and
aggregating the respective partial data streams received by the plurality of devices via the respective data connections to form the first data stream.

8. The tangible machine readable medium of claim 7, wherein the operations further include:
identifying the plurality of devices via which the communication of the first data stream is to be distributed; and
establishing respective communication links with the plurality of devices via which the respective partial data streams are to be received from the plurality of devices.

9. The tangible machine readable medium of claim 7, wherein a number of network addresses received corresponds to a number of devices indicated in the first request as being included in the shared connection.

10. The tangible machine readable medium of claim 7, wherein the operations further include receiving the partial data streams via communication links established with the plurality of devices.

11. The tangible machine readable medium of claim 7, wherein the operations further include providing the first data stream formed by aggregating the partial data streams to a presentation device.

12. The tangible machine readable medium of claim 7, wherein the operations include:
detecting a change in membership of the plurality of devices; and
reporting the change.

13. An apparatus to distribute communication of a first data stream among multiple devices, the apparatus comprising:
memory including machine readable instructions; and
a processor responsive to the machine readable instructions to perform operations including:
sending a first request to a distribution system to establish a shared connection to distribute the communication of the first data stream among a plurality of devices, the apparatus being separate from the plurality of devices;
receiving, in response to the first request sent to the distribution system, a plurality of network addresses of the distribution system assigned by the distribution system to the first request and a sharing code assigned by the distribution system particularly to the first request, the sharing code to associate the plurality of devices with the shared connection corresponding to the first request, the plurality of network addresses allocated to the plurality of devices for sending subsequent requests to the distribution system to establish respective data connections with the distribution system to carry respective partial data streams forming the first data stream;

distributing the network addresses to the plurality of devices to be used by the plurality of devices to establish the respective data connections with the distribution system;

distributing the sharing code to the plurality of devices for inclusion in the subsequent requests to be sent from the respective ones of the plurality of devices to the distribution system to establish the respective data connections with the distribution system; and aggregating the respective partial data streams received by the plurality of devices via the respective data connections to form the first data stream.

14. The apparatus of claim 13, wherein the operations further include:

identifying the plurality of devices via which the communication of the first data stream is to be distributed; and establishing respective communication links with the plurality of devices via which the respective partial data streams are to be received from the plurality of devices.

15. The apparatus of claim 13, wherein a number of network addresses received corresponds to a number of devices indicated in the first request as being included in the shared connection.

16. The apparatus of claim 13, wherein the operations further include receiving the partial data streams via communication links established with the plurality of devices.

17. The apparatus of claim 13, wherein the operations further include:

detecting a change in membership of the plurality of devices; and reporting the change.

18. The apparatus of claim 13, wherein the operations further include providing the first data stream formed by aggregating the partial data streams to a presentation device.

* * * * *